(12) United States Patent
Toews et al.

(10) Patent No.: US 12,140,028 B2
(45) Date of Patent: Nov. 12, 2024

(54) COOLING FOR GEOTHERMAL WELL DRILLING

(71) Applicant: Eavor Technologies Inc., Calgary (CA)

(72) Inventors: Matthew Toews, Calgary (CA); Michael Holmes, Calgary (CA); Ariel Torre, Calgary (CA); Aleksandr Vetsak, Calgary (CA); Mark Hodder, Calgary (CA)

(73) Assignee: Eavor Technologies Inc.

( * ) Notice: Subject to any disclaimer, the term of this patent is extended or adjusted under 35 U.S.C. 154(b) by 0 days.

(21) Appl. No.: 18/114,798

(22) Filed: Feb. 27, 2023

(65) Prior Publication Data

US 2023/0228155 A1 Jul. 20, 2023

Related U.S. Application Data

(63) Continuation of application No. PCT/IB2021/057883, filed on Aug. 27, 2021.
(Continued)

(51) Int. Cl.
*E21B 7/18* (2006.01)
*E21B 3/02* (2006.01)
(Continued)

(52) U.S. Cl.
CPC .............. *E21B 7/18* (2013.01); *E21B 3/02* (2013.01); *E21B 7/046* (2013.01); *E21B 7/14* (2013.01);
(Continued)

(58) Field of Classification Search
CPC .............. E21B 7/18; E21B 3/02; E21B 7/046; E21B 7/14; E21B 17/006; E21B 36/001; E21B 43/261
See application file for complete search history.

(56) References Cited

U.S. PATENT DOCUMENTS

| 3,424,254 A | 1/1969 | Huff |
| 3,786,858 A | 1/1974 | Potter et al. |

(Continued)

FOREIGN PATENT DOCUMENTS

| CA | 2123075 | 11/1994 |
| CA | 2210866 | 1/1998 |

(Continued)

OTHER PUBLICATIONS

Cui et al., "Geothermal Exploitation from hot dry rocks via recycling heat transmission in a horizontal well" Energy, vol. 128, 366-377, 12 pages.
(Continued)

*Primary Examiner* — Jonathan Malikasim
(74) *Attorney, Agent, or Firm* — Fish & Richardson P.C.

(57) ABSTRACT

A method for drilling a geothermal well in a subterranean zone includes drilling, with a drill string, a wellbore of the geothermal well in the subterranean zone. An inherent temperature of the rock adjacent a rock face at a downhole end of the wellbore is at least 250 degrees Celsius. While drilling, a drilling fluid is flowed at a temperature at the rock face such that a difference between the inherent temperature of the rock adjacent the rock face and the temperature of the drilling fluid at the rock face is at least 100 degrees Celsius.

24 Claims, 16 Drawing Sheets

Related U.S. Application Data

(60) Provisional application No. 63/184,706, filed on May 5, 2021, provisional application No. 63/152,707, filed on Feb. 23, 2021, provisional application No. 63/115,096, filed on Nov. 18, 2020, provisional application No. 63/087,438, filed on Oct. 5, 2020, provisional application No. 63/071,510, filed on Aug. 28, 2020.

(51) Int. Cl.
| | | |
|---|---|---|
| *E21B 7/04* | (2006.01) | |
| *E21B 7/14* | (2006.01) | |
| *E21B 17/00* | (2006.01) | |
| *E21B 36/00* | (2006.01) | |
| *E21B 43/26* | (2006.01) | |

(52) U.S. Cl.
CPC .......... *E21B 17/006* (2013.01); *E21B 36/001* (2013.01); *E21B 43/261* (2013.01)

(56) References Cited

U.S. PATENT DOCUMENTS

| | | | |
|---|---|---|---|
| 3,817,038 A | 6/1974 | Paull et al. | |
| 4,060,988 A | 12/1977 | Arnold | |
| 4,137,720 A | 2/1979 | Rex | |
| 4,665,985 A | 5/1987 | Berrod et al. | |
| 4,741,405 A | 5/1988 | Moeny et al. | |
| 5,515,679 A | 5/1996 | Shulman | |
| 5,685,362 A | 11/1997 | Brown | |
| 5,687,999 A * | 11/1997 | Lancry | E21B 17/0423 |
| | | | 285/333 |
| 5,715,895 A * | 2/1998 | Champness | F16L 9/18 |
| | | | 166/57 |
| 5,803,185 A | 9/1998 | Barr et al. | |
| 5,911,282 A | 6/1999 | Onan et al. | |
| 5,992,507 A | 11/1999 | Peterson | |
| 6,000,471 A | 12/1999 | Langset | |
| 6,028,534 A | 2/2000 | Ciglenec et al. | |
| 6,059,036 A | 5/2000 | Chatterji et al. | |
| 6,073,448 A | 6/2000 | Lozada | |
| 6,102,120 A | 8/2000 | Chen et al. | |
| 6,247,313 B1 | 6/2001 | Moe | |
| 6,301,894 B1 | 10/2001 | Halff | |
| 6,626,243 B1 | 9/2003 | Go Boncan | |
| 6,668,554 B1 | 12/2003 | Brown | |
| 6,679,326 B2 | 1/2004 | Zakiewicz | |
| 6,702,044 B2 * | 3/2004 | Reddy | C09K 8/508 |
| | | | 507/140 |
| 6,708,494 B1 | 3/2004 | Hamann | |
| 6,938,707 B2 | 9/2005 | Schmidt et al. | |
| 7,000,711 B2 | 2/2006 | Miller et al. | |
| 7,146,823 B1 | 12/2006 | Wiggs | |
| 7,198,107 B2 | 4/2007 | Maguire | |
| 7,207,603 B2 | 4/2007 | Segreto | |
| 7,251,938 B1 | 8/2007 | Bond | |
| 7,740,068 B2 * | 6/2010 | Ballard | C09K 8/035 |
| | | | 106/633 |
| 7,753,122 B2 * | 7/2010 | Curlett | E21B 43/17 |
| | | | 166/305.1 |
| 8,020,382 B1 | 9/2011 | Zakiewicz | |
| 8,307,896 B2 | 11/2012 | Sarria | |
| 8,381,523 B2 | 2/2013 | Eli et al. | |
| 8,616,000 B2 | 12/2013 | Parella | |
| 8,672,058 B2 | 3/2014 | Tommie et al. | |
| 8,708,046 B2 | 4/2014 | Montgomery | |
| 8,727,035 B2 | 5/2014 | Tollefsen et al. | |
| 8,822,386 B2 | 9/2014 | Quintero et al. | |
| 8,991,488 B2 | 3/2015 | Loveday | |
| 9,016,374 B2 | 4/2015 | Quintero et al. | |
| 9,027,669 B2 * | 5/2015 | Dirksen | E21B 36/001 |
| | | | 175/17 |
| 9,121,393 B2 | 9/2015 | Schwarck | |
| 9,212,304 B2 | 12/2015 | McDonald | |
| 9,243,485 B2 * | 1/2016 | Kosakewich | E21B 43/2405 |
| 9,279,322 B2 | 3/2016 | Dirksen | |
| 9,458,023 B2 | 10/2016 | McDonald et al. | |
| 9,512,705 B2 | 12/2016 | Benson et al. | |
| 9,556,856 B2 | 1/2017 | Stewart et al. | |
| 9,758,711 B2 | 9/2017 | Quintero et al. | |
| 9,803,626 B1 | 10/2017 | Eastman et al. | |
| 9,845,423 B2 | 12/2017 | Franzt et al. | |
| 9,850,767 B2 * | 12/2017 | Guo | F01D 5/288 |
| 9,869,167 B2 | 1/2018 | Randolph | |
| 10,060,195 B2 | 8/2018 | Moeny | |
| 10,260,778 B2 | 4/2019 | Sonju et al. | |
| 10,527,026 B2 | 1/2020 | Muir et al. | |
| 10,774,617 B2 | 9/2020 | Zhan | |
| 11,242,726 B2 | 2/2022 | Toews et al. | |
| 11,708,744 B2 | 7/2023 | Wang et al. | |
| 2004/0123985 A1 | 7/2004 | Whitfill et al. | |
| 2006/0108150 A1 | 5/2006 | Luke et al. | |
| 2006/0250274 A1 | 11/2006 | Mombourquette et al. | |
| 2007/0223999 A1 | 9/2007 | Curlett | |
| 2007/0245729 A1 * | 10/2007 | Mickleson | F01K 23/02 |
| | | | 60/641.2 |
| 2008/0190614 A1 | 8/2008 | Ballard | |
| 2009/0014180 A1 | 1/2009 | Stegemeier et al. | |
| 2010/0071366 A1 | 3/2010 | Klemencic | |
| 2010/0243242 A1 | 9/2010 | Boney et al. | |
| 2010/0272515 A1 | 10/2010 | Curlett | |
| 2010/0276115 A1 | 11/2010 | Parella | |
| 2011/0011557 A1 | 1/2011 | Shelton, Jr. | |
| 2011/0048005 A1 | 3/2011 | McHargue | |
| 2011/0061382 A1 | 3/2011 | Stern | |
| 2011/0067869 A1 | 3/2011 | Bour et al. | |
| 2011/0100002 A1 | 5/2011 | Muir et al. | |
| 2011/0224942 A1 | 9/2011 | Kidwell | |
| 2011/0247816 A1 | 10/2011 | Carter, Jr. | |
| 2011/0306524 A1 | 12/2011 | Smith | |
| 2012/0080163 A1 | 4/2012 | Hoffman | |
| 2012/0174581 A1 * | 7/2012 | Vaughan | F24T 10/10 |
| | | | 290/40 C |
| 2013/0255258 A1 | 10/2013 | Loveday | |
| 2013/0299036 A1 | 11/2013 | Loveday | |
| 2013/0338835 A1 | 12/2013 | Pepe | |
| 2014/0130498 A1 | 5/2014 | Randolph | |
| 2014/0133519 A1 | 5/2014 | Freitag et al. | |
| 2014/0326668 A1 | 11/2014 | Loveday | |
| 2014/0367172 A1 * | 12/2014 | Evans | E21B 17/00 |
| | | | 175/73 |
| 2015/0198019 A1 * | 7/2015 | Affholter | E21B 43/162 |
| | | | 166/272.6 |
| 2015/0285049 A1 | 10/2015 | Tejada | |
| 2016/0040518 A1 | 2/2016 | Potapenko et al. | |
| 2016/0211664 A1 | 7/2016 | Subbotin et al. | |
| 2016/0245550 A1 | 8/2016 | Sonju et al. | |
| 2016/0273345 A1 | 9/2016 | Donderici et al. | |
| 2017/0058181 A1 | 3/2017 | Frantz et al. | |
| 2017/0130116 A1 | 5/2017 | McDonald et al. | |
| 2017/0137694 A1 | 5/2017 | Van Oort et al. | |
| 2017/0211849 A1 | 7/2017 | Muir et al. | |
| 2017/0299226 A1 | 10/2017 | Buscheck | |
| 2018/0274524 A1 | 9/2018 | Moncarz et al. | |
| 2019/0055930 A1 | 2/2019 | Muir et al. | |
| 2019/0154010 A1 | 5/2019 | Toews | |
| 2019/0346181 A1 | 11/2019 | Toews et al. | |
| 2020/0011151 A1 | 1/2020 | Toews et al. | |
| 2020/0049380 A1 | 2/2020 | Cairns et al. | |
| 2020/0299562 A1 | 9/2020 | Van Slyke et al. | |
| 2021/0325089 A1 | 10/2021 | Toews et al. | |
| 2021/0396079 A1 * | 12/2021 | Staack | E21B 7/15 |
| 2022/0372838 A1 | 11/2022 | Toews et al. | |

FOREIGN PATENT DOCUMENTS

| | | |
|---|---|---|
| CA | 2449302 | 12/2002 |
| CA | 2790616 | 8/2011 |
| CA | 2998782 | 10/2018 |
| CA | 3013374 | 4/2019 |
| CA | 3041002 | 5/2019 |
| CA | 3038294 | 6/2019 |

(56) References Cited

FOREIGN PATENT DOCUMENTS

| | | |
|---|---|---|
| CA | 3044153 | 1/2020 |
| CL | 2019003665 | 7/2020 |
| CN | 101027480 | 8/2007 |
| CN | 201593889 | 9/2010 |
| CN | 102758595 | 10/2012 |
| CN | 203978273 | 12/2014 |
| CN | 106246101 | 12/2016 |
| CN | 106246142 | 12/2016 |
| CN | 106368608 | 2/2017 |
| CN | 108291437 | 7/2018 |
| CN | 109652028 | 4/2019 |
| EP | 0875657 | 11/1998 |
| EP | 1435428 | 7/2004 |
| GB | 2518442 | 3/2015 |
| GE | 2097448 | 11/1982 |
| JP | H 3-50874 | 3/1991 |
| JP | H04-203195 | 7/1992 |
| JP | H06-37827 | 5/1994 |
| JP | 3091479 | 9/2000 |
| JP | 2007-198723 | 8/2007 |
| JP | 2014-51856 | 3/2014 |
| JP | 2016-118078 | 6/2016 |
| JP | 2017025730 | 2/2017 |
| JP | 6735839 | 8/2020 |
| JP | 6848006 | 3/2021 |
| JP | H 7-260054 | 4/2023 |
| RU | 2670292 | 10/2018 |
| WO | WO 2002/103152 | 12/2002 |
| WO | WO 2003106585 | 12/2003 |
| WO | WO 2008003092 | 1/2008 |
| WO | WO 2010027866 | 3/2010 |
| WO | WO 2010072407 | 7/2010 |
| WO | WO 2011053884 | 5/2011 |
| WO | WO 2012068279 | 5/2012 |
| WO | WO 2012082962 | 6/2012 |
| WO | WO 2013013174 | 1/2013 |
| WO | WO 2013109890 | 7/2013 |
| WO | WO 2013152138 | 10/2013 |
| WO | WO 2014008483 | 1/2014 |
| WO | WO 2014081911 | 5/2014 |
| WO | WO 2014182732 | 11/2014 |
| WO | WO 2015030601 | 3/2015 |
| WO | WO 2015134974 | 9/2015 |
| WO | WO 2015192011 | 12/2015 |
| WO | WO 2016091969 | 6/2016 |
| WO | WO 2017053884 | 3/2017 |
| WO | WO 2017146712 | 8/2017 |
| WO | WO 2018112610 | 6/2018 |
| WO | WO 2018136033 | 7/2018 |
| WO | WO 2019095032 | 5/2019 |
| WO | WO 2019157341 | 8/2019 |
| WO | WO 2019164691 | 8/2019 |
| WO | WO 2020236189 | 11/2020 |
| WO | WO 2022155743 | 7/2022 |

OTHER PUBLICATIONS

International Preliminary Report on Patentability in International Appln. No. PCT/IB2021/057883, mailed on Mar. 9, 2023, 7 pages.
International Search Report and Written Opinion in International Appln. No. PCT/IB2021/057883, mailed on Dec. 2, 2021, 9 pages.
Jellison et al., "Lightweight, ultra-high-strength drill pipe may meet demands of ERD, critical deep drilling." Drilling contractor 3.4, 2009, 53-56.
Noorollahi et al., "Three dimensional modeling of heat extraction from abandoned oil well for application in sugarcane industry in Ahvaz-Souther Iran." Proceedings of the World Geothermal Congress, Apr. 2015, 11 pages.
Schifflechner et al., "Combined Heat and Power Generation by Enhanced Geothermal Systems: Comparison of Direct and Indirect Concepts for Water and Supercritical CO2 as Heat Carriers," 5th International Seminar on ORC Power Systems, Sep. 9-11, 2019, 8 pages.
Templeton et al., "Abandoned Oil/Gas Wells as Sustainable Sources of Renewable Energy." Proc. 23rd World Mining Congress, 2013, 10 pages.
Titanium Engineers, "Titanium 6Al—4V Ti 6-4 Grade 5 (UNS R56400)" Nov. 2012, 2 pages.
Bauer et al., "High-temperature plug formation with silicates." SPE international Symposium on Oilfield chemistry. Society of Petroleum Engineers, Jan. 2005, 8 pages.
CN Office Action issued in Chinese Appln. No. 201910593698.5, dated Mar. 30, 2021, 19 pages (With English Translation).
CN Office Action issued in Chinese Appln. No. 201910593698.5, dated Nov. 17, 2021, 22 pages (With English Translation).
EP Communication Pursuant to Article 94 (3) EPC issued in European Appln. No. 19830007.1, dated Oct. 1, 2021, 8 pages.
EP Supplemental European Search Report issued in European Appln. No. 19830007.1, dated Dec. 18, 2020, 5 pages.
Examination Report issued in African Regional Appln. No. AP/P/2020/012564, dated Jun. 23, 2022, 6 pages.
Final Office Action issued in U.S. Appl. No. 16/423,020 on Jul. 26, 2021, 14 pages.
Freeman et al., "Single PDC cutter studies of fluid heat transfer and cutter thermal mortality in drilling fluid." AADE paper, Apr. 2012, 6 pages.
GCC Examination Report issued in Gulf Cooperation Council Appln. No. GC 2019-37842, dated Nov. 16, 2021, 5 pages.
GCC Examination Report issued in Gulf Cooperation Council Appln. No. GC 2019-37842, dated Jun. 26, 2020, 7 pages.
Hung et al., "Penetration rate prediction for percussive drilling with rotary in very hard rock" Journal of Science and Technology, Vietnam Academy of Science and Technology, 2016, 54 (1), 133-149, 18 pages.
IN Examination Report issued in Indian Appln. No. 201924020812, dated Jan. 3, 2022, 7 pages (With English Translation).
International Preliminary Report on Patentability in International Appln. No. PCT/CA2020/000136, mailed on Nov. 3, 2022, 9 pages.
International Search Report and Written Opinion in International Appln. No. PCT/CA2019/000076, dated Jul. 25, 2019, 12 pages.
International Search Report and Written Opinion in International Appln. No. PCT/CA2020/000136, dated Mar. 22, 2021, 14 pages.
IS Search Report issued in Iceland Appln. No. 202000873, dated Aug. 5, 2020, 2 pages.
JP Office Action issued in Japanese Appln. No. 2019-102547, dated Jun. 29, 2020, 11 pages (With English Translation).
JP Office Action issued in Japanese Appln. No. 2019-102547, dated Nov. 2, 2020, 9 pages (With English Translation).
Kahraman et al. "Dominant rock properties affecting the penetration rate of percussive drills" International Journal of Rock Mechanics & Mining Sciences 40, 2003, 711-723, 13 pages.
Monteiro et al., "Temperature Control of Drilling Fluid with Phase Change Materials" Apr. 2012, 9 pages.
Mortensen, "Hot Dry Rock: A New Geothermal Energy Source", Energy vol. 3, Issue 5, Oct. 1978, 639-644, 6 pages.
Non-Final Office Action issued in U.S. Appl. No. 16/423,020 on Jan. 11, 2021, 18 pages.
Non-Final Office Action issued in U.S. Appl. No. 17/665,002 on Nov. 9, 2022, 22 pages.
Notice of Allowance issued in U.S. Appl. No. 16/423,020 on Sep. 23, 2021, 7 pages.
NZ Examination Report issued in New Zealand Appln. No. 764529, dated Apr. 8, 2021, 2 pages .
NZ Examination Report issued in New Zealand Appln. No. 764529, dated Sep. 9, 2020, 5 pages.
Office Action in Australian Appln. No. 2020302974, dated Nov. 26, 2022, 4 pages.
Office Action in Colombia Appln. No. 20-15501, dated Jan. 31, 2023, 6 pages.
Office Action in Indian Appln. No. 202225043232, Oct. 11, 2022, 6 pages (with English translation).
Office Action in Indonesia Appln. No. P00201904638, dated Nov. 18, 2022, 4 pages (with English translation).
SG Office Action issued in Singapore Appln. No. 11202005041V, dated Oct. 11, 2020, 8 pages.

(56) References Cited

OTHER PUBLICATIONS

SG Office Action issued in Singapore Appln. No. 11202005041V, dated Nov. 15, 2021, 8 pages.
Shen et al., "Experimental Study on Temperature Change and Crack Expansion of High Temperature Granite under Different Cooling Shock Treatments." Energies 12.11, 2097, 2019, 17 pages.
Slb.com [online], "PowerDrive ICE" Jan. 2020 [retrieved on Jan. 12, 2021], retrieved from: URL <https://www.slb.com/drilling/bottomhole-assemblies/directional-drilling/powerdrive-ice-ht-rotary-steerable-system>, 7 pages.
Office Action in Japanese Appln. No. 2023-513819, mailed on Apr. 8, 2024, 10 pages.
Office Action in Chile Appln. No. 2023-00463, mailed on Apr. 30, 2024, 38 pages (with machine translation).
Extended European Search Report in European Appln. No. 21860714.1, mailed on Jul. 22, 2024, 7 pages.
Office Action in Singapore Appln. No. 11202301050V, mailed on Aug. 16, 2024, 11 pages.

\* cited by examiner

COOLING FOR GEOTHERMAL WELL DRILLING

CROSS REFERENCE TO RELATED APPLICATIONS

This application is a continuation of International Application No. PCT/IB2021/057883, filed on Aug. 27, 2021, which claims priority to U.S. Provisional Patent Application No. 63/184,706, filed on May 5, 2021; U.S. Provisional Patent Application No. 63/152,707, filed on Feb. 23, 2021; U.S. Provisional Patent Application No. 63/115,096, filed on Nov. 18, 2020; U.S. Provisional Patent Application No. 63/087,438, filed on Oct. 5, 2020; and U.S. Provisional Patent Application No. 63/071,510, filed on Aug. 28, 2020. The entire contents of each of the foregoing applications are incorporated herein by reference.

TECHNICAL FIELD

This disclosure relates to geothermal well drilling.

BACKGROUND

Wells drilled for geothermal systems can encounter high formation temperatures. Such high temperatures can create challenges with respect to rate of penetration, functioning of downhole electronics, and other factors.

SUMMARY

This disclosure relates to geothermal well drilling.

Certain aspects of the subject matter herein can be implemented as a method for drilling a geothermal well in a subterranean zone. The method includes drilling, with a drill string, a wellbore of the geothermal well in the subterranean zone. An inherent temperature of the rock adjacent a rock face at a downhole end of the wellbore is at least 250 degrees Celsius. While drilling, a drilling fluid is flowed at a temperature at the rock face such that a difference between the inherent temperature of the rock adjacent the rock face and the temperature of the drilling fluid at the rock face is at least 100 degrees Celsius.

An aspect combinable with any of the other aspects can include the following features. The difference between the inherent temperature of the rock adjacent the rock face and the temperature of the drilling fluid at the rock face causes a thermally induced stress in the rock at the rock face that is greater than the tensile strength of the rock at the rock face.

An aspect combinable with any of the other aspects can include the following features. The downhole end of the wellbore is at a measured depth of at least 4000 meters.

An aspect combinable with any of the other aspects can include the following features. The downhole end of the wellbore is at a vertical depth of at least 6000 meters.

An aspect combinable with any of the other aspects can include the following features. The difference between the inherent temperature of the rock adjacent the rock face and the temperature of the drilling fluid at the rock face is at least 175 degrees Celsius.

An aspect combinable with any of the other aspects can include the following features. The inherent temperature of the rock adjacent the rock face is at least 350 degrees Celsius and the difference between the inherent temperature of the rock adjacent the rock face and the temperature of the drilling fluid at the rock face is at least 200 degrees Celsius.

An aspect combinable with any of the other aspects can include the following features. The inherent temperature of the rock adjacent the rock face is at least 500 degrees Celsius and the difference between the inherent temperature of the rock adjacent the rock face and the temperature of the drilling fluid at the rock face is at least 350 degrees Celsius.

An aspect combinable with any of the other aspects can include the following features. The wellbore is a lateral wellbore.

An aspect combinable with any of the other aspects can include the following features. The downhole end of the drill string comprises a rotary drilling bit.

An aspect combinable with any of the other aspects can include the following features. The downhole end of the drill string comprises a contactless drilling bit configured to break formation material at the rock face without requiring contact between the bit and the rock face.

An aspect combinable with any of the other aspects can include the following features. A closed-loop geothermal well system is formed that includes the wellbore.

An aspect combinable with any of the other aspects can include the following features. The wellbore is a lateral wellbore. Forming the closed-loop system includes drilling the lateral wellbore from a first surface wellbore and connecting, by the lateral wellbore, the first surface wellbore with a second surface wellbore.

An aspect combinable with any of the other aspects can include the following features. The difference between the inherent temperature of the rock adjacent the rock face and the temperature of the drilling fluid at the rock face induces radial tensile fractures in at least a portion of a wall of the wellbore. The method also includes sealing the radial tensile fractures with a sealing material.

An aspect combinable with any of the other aspects can include the following features. The drill string includes a plurality of tubular segments. At least one of the tubular segments includes a coating layer at least partially covering a circumferential surface of the tubular segment. A length normalized thermal resistance of a coated wall portion of the tubing string is at least 0.002 meters kelvin per watt.

An aspect combinable with any of the other aspects can include the following features. A length normalized thermal resistance of the coated wall portion is at least 0.01 meters kelvin per watt.

An aspect combinable with any of the other aspects can include the following features. The plurality of tubular segments are connected to each other at connection joints. The coating layer at least partially covers a circumferential surface of one or more of the connection joints.

An aspect combinable with any of the other aspects can include the following features. The wellbore is a first wellbore. The method also includes forming a second wellbore that intersects the first wellbore. A second stream of drilling fluid is flowed down the second wellbore, and the second stream provides at least a portion of the drilling fluid flowing at the rock face. In addition to or instead of the second stream, a return stream of drilling fluid is diverted from the downhole end of the first wellbore up the second wellbore.

An aspect combinable with any of the other aspects can include the following features. The method also includes positioning an intermediate tubular string in the well, and positioning the drill string within the intermediate tubular string. In this way, an inner annulus is formed between the exterior of the drill string and the interior of the intermediate tubular string that extends downhole at least partially along the length of the drill string. The method also includes at least partially filling the inner annulus with an insulating material.

An aspect combinable with any of the other aspects can include the following features. The insulating material is or includes a gas.

An aspect combinable with any of the other aspects can include the following features. The method also includes adding to the drilling fluid a phase-change material specified to undergo a phase change proximate to the downhole end of the drill string.

An aspect combinable with any of the other aspects can include the following features. The drill string includes an uphole portion including a first plurality of tubular segments and a downhole portion including a second plurality of tubular segments. A majority of the first plurality of tubular segments have a tensile strength at least 25% greater than the tensile strength of the majority of the second plurality of tubular segments. A majority of the second plurality of tubular segments are at least 35% lighter than the majority of the first plurality of tubular segments.

Certain aspects of the subject matter herein can be implemented as a method for forming a geothermal system in a subterranean zone. The method includes drilling a first surface wellbore and a second surface wellbore. A lateral wellbore is drilled from the first surface wellbore to connect the first surface wellbore with the second surface wellbore in the subterranean zone. Drilling the lateral wellbore includes positioning a drill string in a lateral wellbore. The drill string defines a conduit for flowing a drilling fluid to a rock face at a downhole end of the lateral wellbore to displace broken formation material from the rock face. The method also includes drilling with the drill string the lateral wellbore further into the subterranean zone. An inherent temperature of the rock adjacent the rock face at a downhole end of the lateral wellbore is at least 250 degrees Celsius. Drilling fluid is flowed in the lateral wellbore at a temperature at the rock face at least 100 degrees Celsius cooler than the inherent temperature of the rock adjacent the rock face. The drill string is removed from the lateral wellbore, and a working fluid is circulated in a closed loop in the first surface wellbore, the second surface wellbore, and the lateral wellbore.

An aspect combinable with any of the other aspects can include the following features. Heat energy is extracted from the working fluid.

Certain aspects of the subject matter herein can be implemented as a system for drilling a wellbore in a geothermal well in a subterranean zone. An inherent temperature of the rock adjacent a rock face at a downhole end of the wellbore is at least 250 degrees Celsius. The system includes a drill string with a drill bit to break a formation at the rock face, and a drilling fluid circulated at the rock face at a temperature such that a difference between the inherent temperature of the rock adjacent the rock face and the temperature of the drilling fluid at the rock face is at least 100 degrees Celsius.

An aspect combinable with any of the other aspects can include the following features. The difference between the inherent temperature of the rock adjacent the rock face and the temperature of the drilling fluid at the rock face causes a thermally induced stress in the rock at the rock face that is greater than the tensile strength of the rock at the rock face.

An aspect combinable with any of the other aspects can include the following features. The downhole end of the wellbore is at a measured depth of at least 4000 meters.

An aspect combinable with any of the other aspects can include the following features. The difference between the inherent temperature of the rock adjacent the rock face and the temperature of the drilling fluid at the rock face is at least 175 degrees Celsius.

An aspect combinable with any of the other aspects can include the following features. The inherent temperature of the rock adjacent the rock face is at least 350 degrees Celsius and the difference between the inherent temperature of the rock adjacent the rock face and the temperature of the drilling fluid at the rock face is at least 200 degrees Celsius.

An aspect combinable with any of the other aspects can include the following features. The wellbore is a lateral wellbore.

DETAILED DESCRIPTION

Figure 1A:
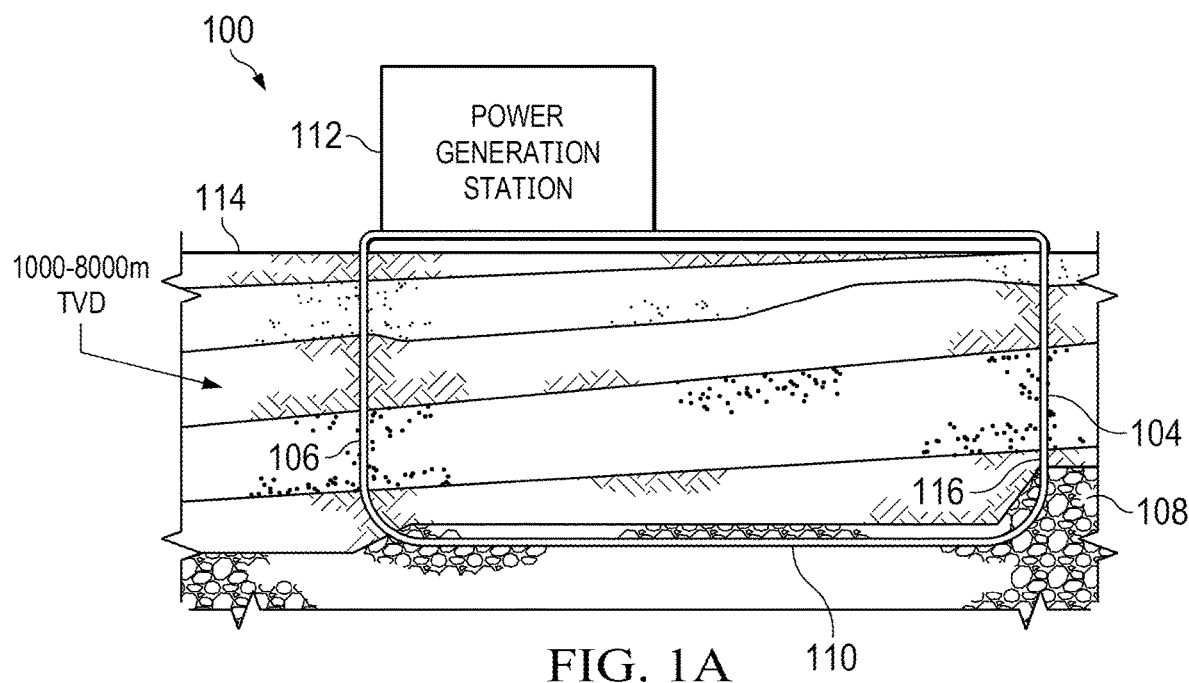
FIG. 1A is schematic illustration of a closed-loop geothermal system in accordance with the concepts herein.

FIG. 1A shows a closed-loop geothermal system in accordance with the concepts herein. The closed-loop geothermal wellbore system can be, for example, a system such as that developed by Eavor Technologies Inc. of Calgary, Alberta, which includes a network of sealed horizontal wellbores which act as a radiator or heat-exchanger with the downhole formation. Descriptions of the methods and apparatus used in some instances of such a closed-loop geothermal system are found in, for example, U.S. Pat. App. Pub. Nos. 20190154010A1, 20190346181A1 and 20200011151A1, the contents of which are hereby incorporated by reference.

Referring to FIG. 1A, closed-loop geothermal system 100 includes an inlet surface wellbore 104 and an outlet surface wellbore 106 connected within subterranean zone 108 by a network of lateral wellbores 110. Subterranean zone 108 is a geological formation, a part of a geological formation, or multiple geological formations. In the illustrated instance, surface wellbores 104 and 106 are substantially vertical; in other instances of the present disclosure, one or both of the surface wellbores may be other than substantially vertical. In the illustrated instance, lateral wellbores 110 connecting the surface wellbores 104 and 106 are substantially horizontal; in some instances of the present disclosure, some or all of the laterals can be other than substantially horizontal and can be substantially straight or curved or have a spiral or other configuration. The lateral wellbores 110 can be sealed and a working fluid added to the closed loop as a circulating fluid. Power generation station 112 is disposed on surface 114 between the inlet surface wellbore 104 and the outlet surface wellbore 106 to complete the closed loop system. Heat from subterranean zone 108 is recovered from the working fluid circulating in loop circuit 116 which is subsequently used to generate power with a generator (not shown) in power generation station 112. In some instances of the present disclosure, lateral wellbores 110 can be anywhere from 2000 meters to 8000 meters or more in length and from 1000 meters to 20000 meters in depth from the surface 114.

Figure 1B:
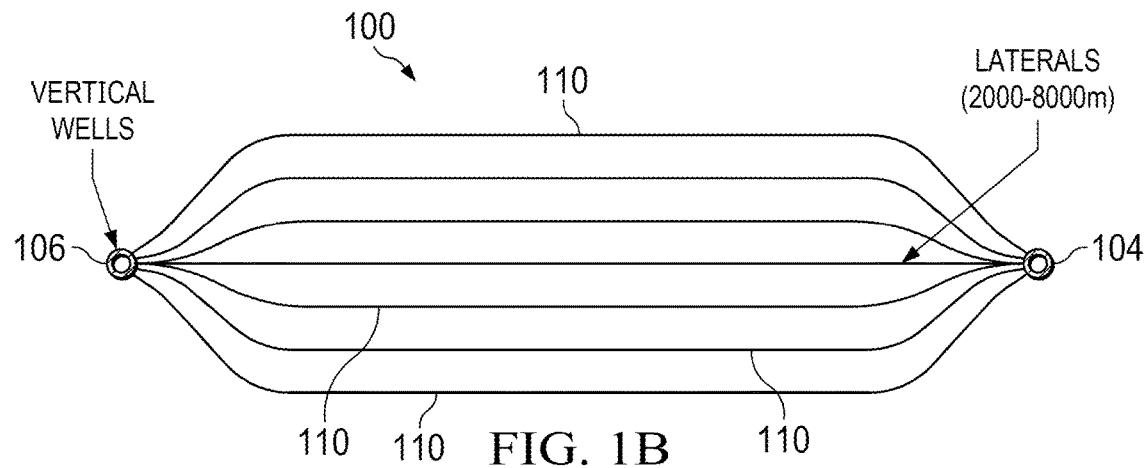
FIG. 1B is a plan view of the closed-loop geothermal system illustrated in FIG. 1A.

FIG. 1B is a plan view of the lateral wellbores 110 that form part of the closed-loop geothermal system 100 of FIG. 1A. Referring to FIG. 1B, lateral wellbores 110 are disposed within the subterranean zone 108 in spaced apart radial relation. Each of the lateral wellbores 110 is commonly connected to inlet wellbore 104 and outlet wellbore 106 in a closed loop. In some instances of the present disclosure, some or all of inlet wellbore 104 and outlet wellbore 106 are cased. Lateral wellbores 110 are in some instances of the present disclosure not cased but instead are sealed without the use of casing by forming an interface between the lateral wellbore and the formation substantially impermeable to fluids.

Although FIGS. 1A and 1B show the inlet wellbore 104 spaced far apart from outlet wellbore 106, in other instances of the present disclosure the wellbores 104 and 106 can be close together and the network of lateral wellbores 110 can be stacked or interleaved and intersect at their toes.

The drilling of a geothermal system such as that shown in FIGS. 1A and 1B can involve drilling through very hard polycrystalline rock, such as granite, at very high temperatures (over 250° C. and in some environments over 400° C. or over 800° C.). Such hard, high temperature rock can be encountered, for example, when drilling deep horizontal well segments such as illustrated in FIGS. 1A and 1B.

Figure 2:
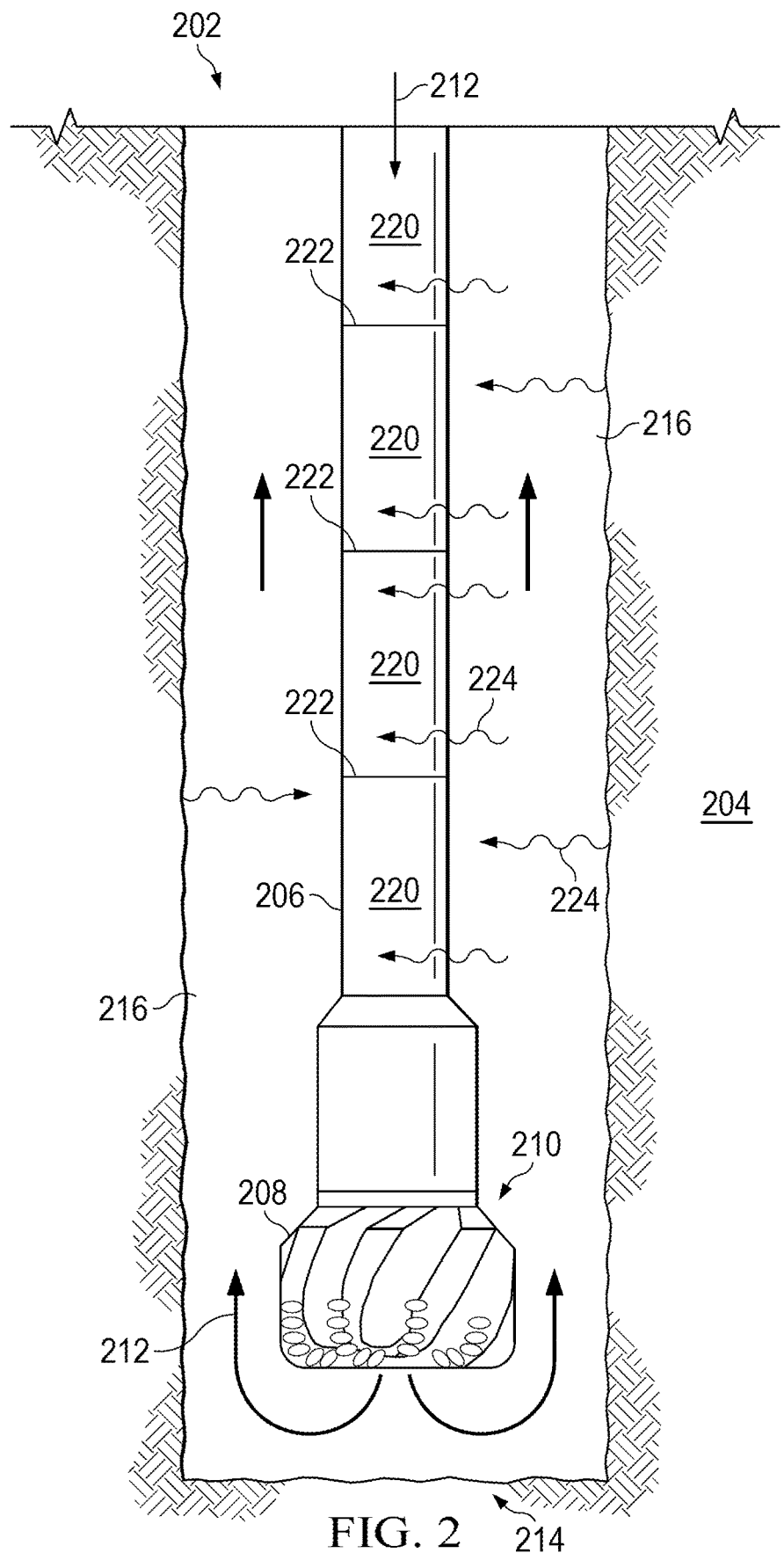
FIG. 2 is a schematic illustration of a drilling system in accordance with the concepts herein.

FIG. 2 is a schematic illustration of a wellbore drilling system 200 in accordance with an instance of the present disclosure, which can be suitable for drilling the inlet surface wellbore 104, outlet surface wellbore 106, and/or lateral wellbores 110 of FIGS. 1A and 1B. Referring to FIG. 2, wellbore 202 is formed in a subterranean zone 204 by drilling with drill string 206 positioned in wellbore 202. Drill string 206 includes a bottomhole assembly (BHA) 210 at its downhole end. BHA 210 includes drilling bit 208 and can further include drill collars, directional drilling instrumentation, and various electrical and electronic components for operating and/or controlling drilling bit 208. The interior of drill string 206 defines a conduit for flowing a drilling fluid 212 to the downhole end of the wellbore to displace broken formation material from rock face 214, which then is carried by drilling fluid 212 up the annulus 216 that is defined between the exterior of drill string 206 and the interior surface of wellbore 202.

Drill string 206 includes a plurality of tubular segments 220 connected to each other at connection joints 222. In some instances of the present disclosure, connection joints 222 comprise threaded box-and-pin joints or another suitable connection.

Heat transfer—illustrated by arrows 224—can flow from the subterranean zone 204 into the annulus 216 as well as from the annulus 216 into the interior of drill string 206 and into the drilling fluid 212 flowing down drill string 206. Accordingly, the heat transfer from subterranean zone 108 to annulus 216 and from annulus 216 to the interior of drill string 206 contributes to the temperature elevation of drilling fluid 212 prior to its delivery to drilling bit 208 by way of the counter current exchange mechanism.

Figure 3A:
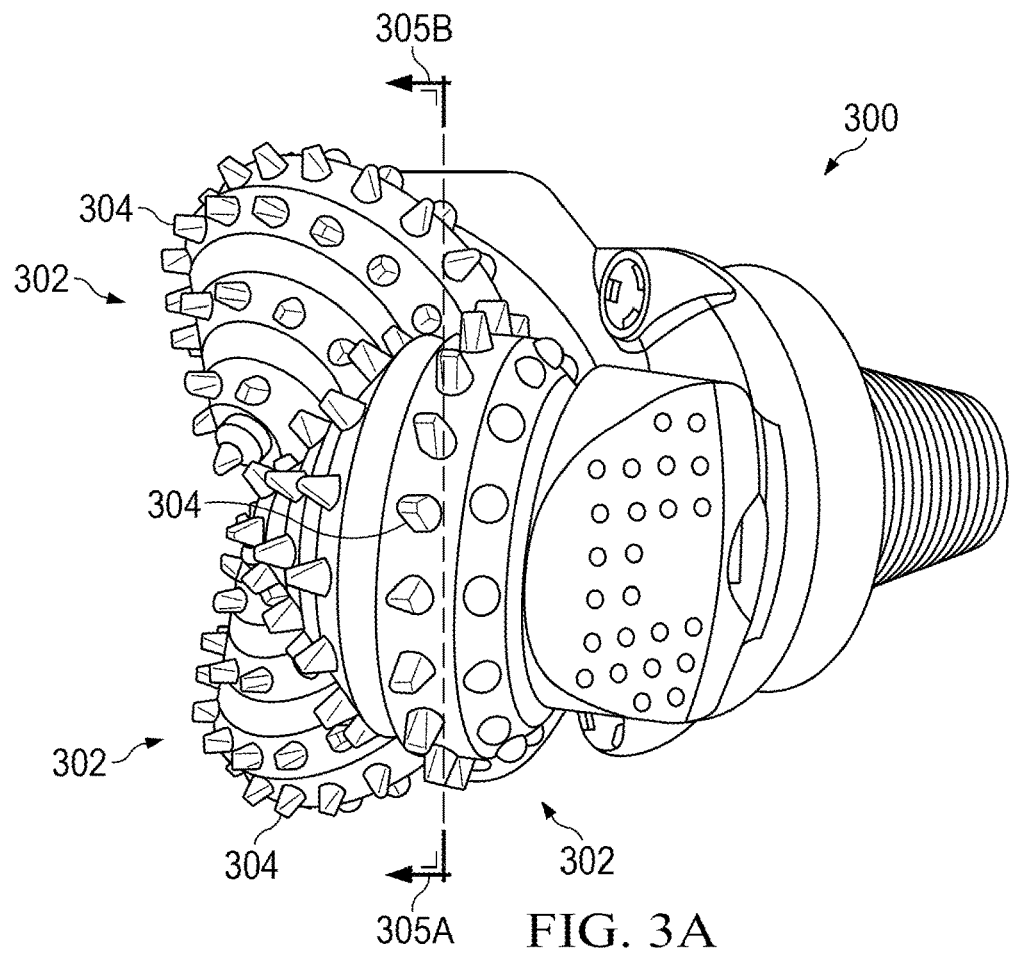
FIG. 3A is a schematic illustration of a drill bit in accordance with the concepts herein.
Figure 3B:
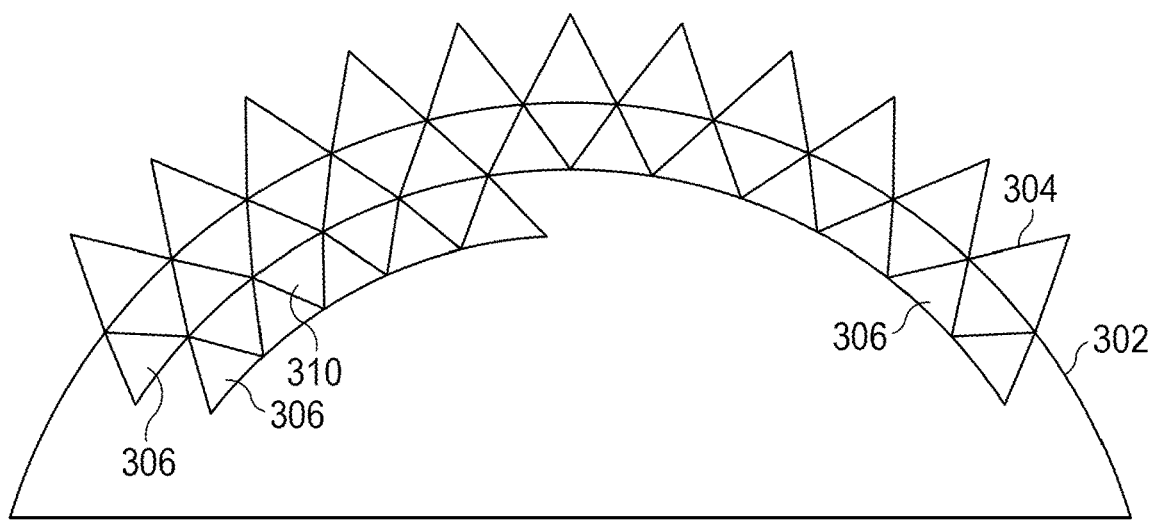
FIG. 3B is a schematic illustration of a cross-section of a drill bit cone in accordance with the concepts herein.

In some instances of the present disclosure, drilling bit 208 is a contact-type drilling bit, such as a polycrystalline diamond compact (PDC) drilling bit, rotary drilling bit and/or other type of drilling bit that relies on contact with the rock to effectuate drilling. An example of suitable contact-type drilling bit is the tricone bit 300 shown in FIGS. 3A and 3B. As shown in FIG. 3A, tricone bit 300 includes three cones 302, each with a plurality of cutting elements 304. FIG. 3B illustrates detail of a section along line 305A-305B shown of FIG. 3A. In this example, each cone 302 includes a plurality of spaced apart cutting elements 304 in a specific spaced apart array over the face of each cone. In order to facilitate extended longevity and prolonged uninterrupted drilling, a series of additional cutting elements 306 may be provided. In this example, the additional cutting elements 306 are positioned beneath cutting elements 304 such that the apices of additional cutting elements 306 are adjacent the contact point of the bases of overlying cutting elements 304. In this disposition, as the elements 304 wear, the apices of additional cutting elements 306 emerge. This can be further accelerated by incorporating a material of different hardness at least in the interstitial spaces 310 between adjacent elements 304 and 306. With this arrangement, the cutting face of each cone is self-renewing. Additional advantages to this feature include the benefit of more even wearing of the bit 300 to reduce eccentric drilling progress and the possibility of jamming or becoming stuck/irretrievable within the bore being formed.

In other instances of the present disclosure, drilling bit 208 of FIG. 2 can be a contactless drilling bit configured to break formation material at the rock face 214 of the subterranean zone 204 at the downhole end of wellbore 202 without requiring contact between bit 208 and rock face 214, and in some instances of the present disclosure can comprise an electrocrushing bit for electro-pulsed drilling. Examples of contactless drilling systems include plasma drilling (such as the plasma drilling system developed by GA Drilling, A.S.), laser drilling (such as the laser drilling system developed by Foro Energy), microwave drilling (such as the microwave drilling system developed by Quaise), thermal spallation techniques such as supercritical water jetting or flame jets, and electro-pulse drilling (such as the electro-pulse drilling systems developed by Tetra Corporation). (It will be understood that portions of a contactless drilling bit may periodically bump, brush against, or otherwise come into contact with the formation during the drilling process.)

In electro-pulse drilling systems such as that developed by Tetra Corporation, an electrocrushing bit is utilized that has multiple electrodes that generate high energy sparks to break formation material and thereby enable it to be cleared from the path of the drilling assembly. The bit can generate multiple sparks per second using a specified excitation current profile that causes a transient spark to form and arc through the most conducting portion of the rock face at the downhole end of the wellbore. The arc causes that portion of the rock face penetrated by the arc to disintegrate or fragment and be swept away by the flow of drilling fluid. A highly resistive drilling fluid is utilized for such electro-pulse drilling. Descriptions of some electro-pulse drilling bits, drilling fluids, and related systems and methods are found in, for example, U.S. Pat. Nos. 4,741,405, 9,027,669, 9,279,322, 10,060,195, U.S. Pat. Pub. No. 20200299562A1, and PCT patent applications WO 2008/003092, WO 2010/027866, WO 2014/008483, WO 2018/136033, and WO 2020/236189, the contents of which are hereby incorporated by reference. Because electro-pulse drilling and other forms of contactless drilling fails the rock in tension (as opposed to compression or shear), there can be a further synergistic effect with the cooling effects discussed in more detail below.

Rate-of-penetration (ROP) can be reduced when the rock is at very high confining pressures and/or that has ductile/plastic characteristics due to the high temperatures that can be encountered in drilling deep geothermal environments, such as when drilling (for example) lateral wellbores 110 of a closed-loop system as illustrated in FIGS. 1A and 1B. Such high temperatures can also interfere with the functioning of downhole electronics and/or sensors. In addition, the drilling of multiple lateral wellbores such as that shown in FIG. 1B can require the extensive use of directional drilling technology. The magnetometers and other downhole equipment used for such directional drilling can be adversely affected by high downhole temperatures. Some downhole components of directional drilling systems have a temperature limit of 150-250° C. Other downhole components can have a different (higher or lower) temperature limit or range.

In some instances of the present disclosure as described below, coating combinations, wellbore geometries, downhole apparatus, and/or additives are used to provide flow of the drilling fluid at the downhole end of the wellbore at a temperature for drilling such that the difference between the inherent temperature of the rock adjacent the rock face (i.e., the temperature, but for the cooling effects of the drilling fluid, of the rock ahead of the drill bit that will immanently be drilled through) and the temperature of the drilling fluid at the rock face is at least 100° C. The temperature of the fluid at the rock face is the bulk fluid temperature where convective cooling of the rock face occurs, for example, within approximately 1 cm of the rock face being drilled. In some instances of the present disclosure, such temperature differential can be in geothermal environments where an inherent temperature of the rock adjacent the rock face is at least 250° C. at measured depth of 4000 meters or greater; i.e., the measured depth through the surface wellbore and the lateral wellbore. (As used herein, the measured depth is the length along the path of a wellbore and differs from the vertical depth of a well in all but a truly vertical well.) In some instances of the present disclosure, the temperature difference can be greater. For example, in an instance of the present disclosure wherein the inherent temperature of the rock adjacent the rock face is at least about 500° C., the difference between the inherent temperature of the rock adjacent the rock face and the temperature of the drilling fluid at the rock face can be at least about 350° C. In other instances of the present disclosure, the temperature difference can be a greater or lesser amount. Such a large temperature difference can increase ROP due the shock cooling effect causing the rock face to thermally contract. This stresses the rock in tension and reduces the effective confining pressure at the rock face. It can also create tensile microfractures within the rock matrix.

Figure 4A:
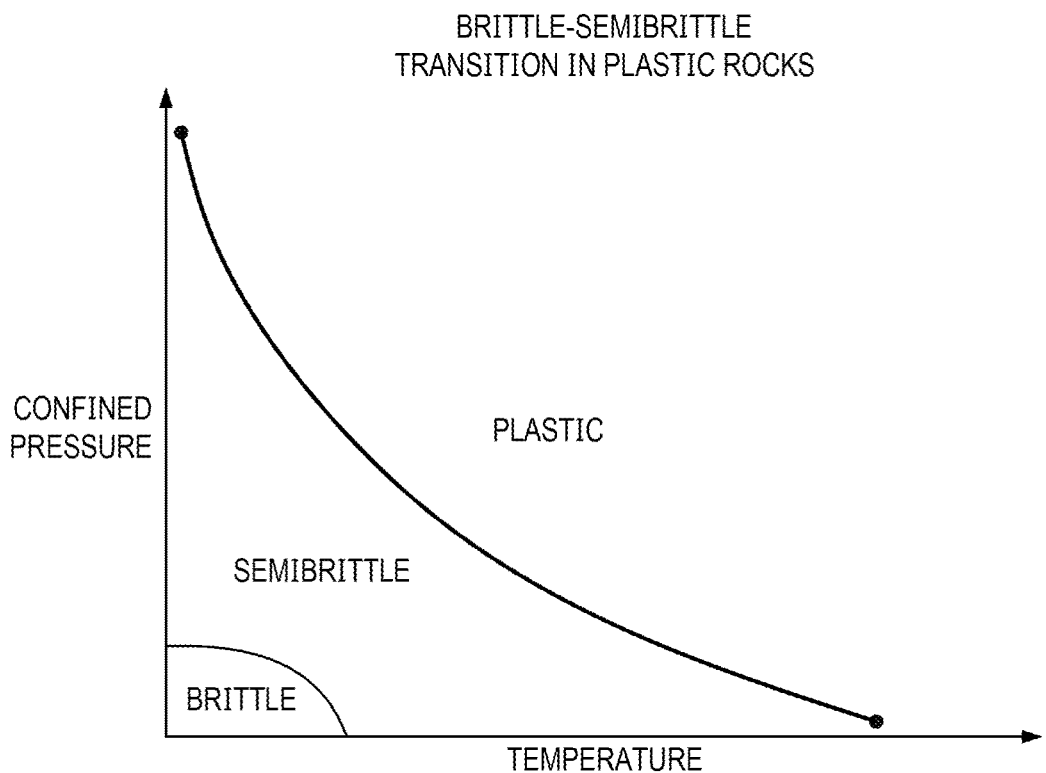
FIG. 4A is a graphical representation of temperature-pressure relation for the brittle to semi-brittle transition in ductile or plastic rocks in accordance with the concepts herein.
Figure 4B:
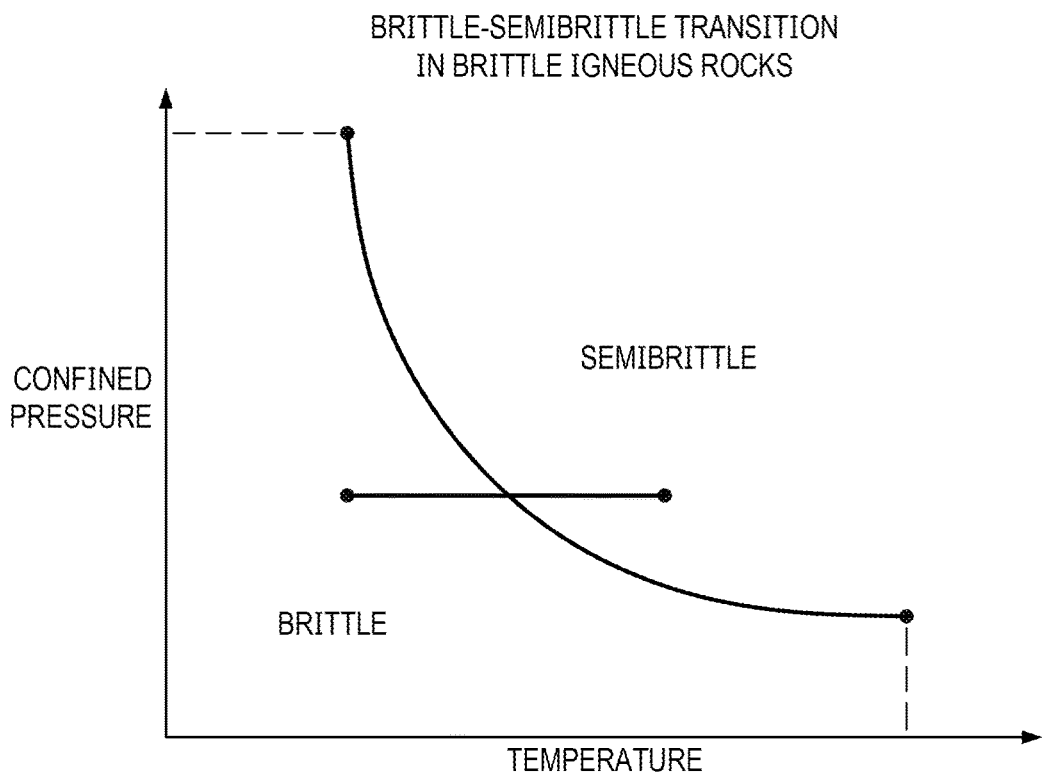
FIG. 4B is a graphical representation of the brittle-semibrittle transition in brittle igneous rocks in accordance with the concepts herein.

For example, FIG. 4A is a graphical representation of temperature-pressure relation for the brittle to semi-brittle transition in ductile or plastic rocks. Ductile rock transitions into a more brittle state when the temperature is decreased or pressure reduced. When a rapid thermal cooling treatment is applied to hot brittle rock, the internal temperature of the rock is lowered and the rock transitions into a more brittle state relative to the untreated rock. FIG. 4B generally illustrates this result. Accordingly, this zonal shift from ductile, semi brittle and any combination within the zone by temperature manipulation renders the treated rock embrittled relative to its initial untreated state.

Figure 5:
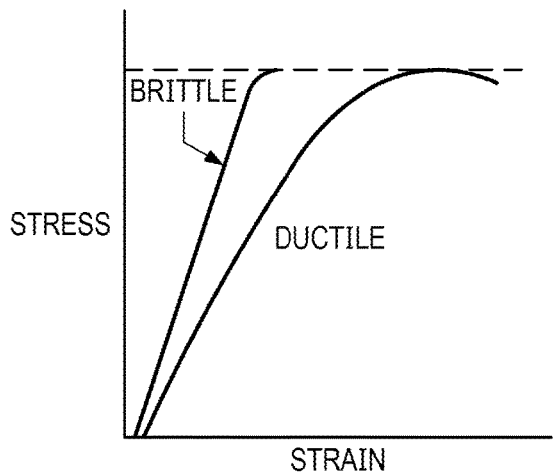
FIG. 5 is a graphical representation of the effect of strain and stress on brittle and ductile rocks in accordance with the concepts herein.

Rock strength (the stress required to cause irreversible deformation) does not necessarily change with an increase in brittleness, as shown in FIG. 5. However, the deformation mode of a brittle rock is sudden failure and fracturing while for more ductile rock, the failure mode is to undergo more plastic deformation prior to failure.

Figure 6A:
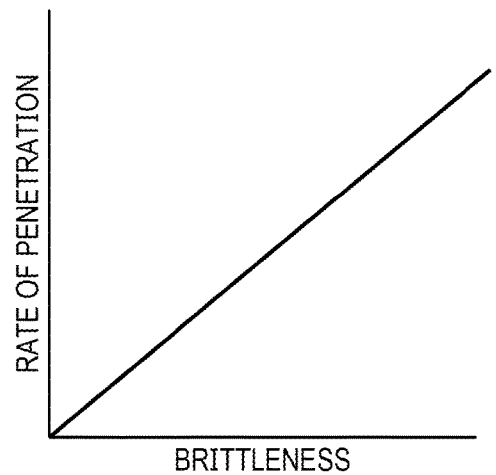
FIG. 6A is a graphical representation of the relationship between rock brittleness and rate of penetration.

As shown in FIG. 6A, rate of penetration generally increases with rock brittleness, regardless of drilling method. In particular, the pulsed-electric drilling system or other contactless drilling system can be especially suited for brittle rocks.

Figure 6B:
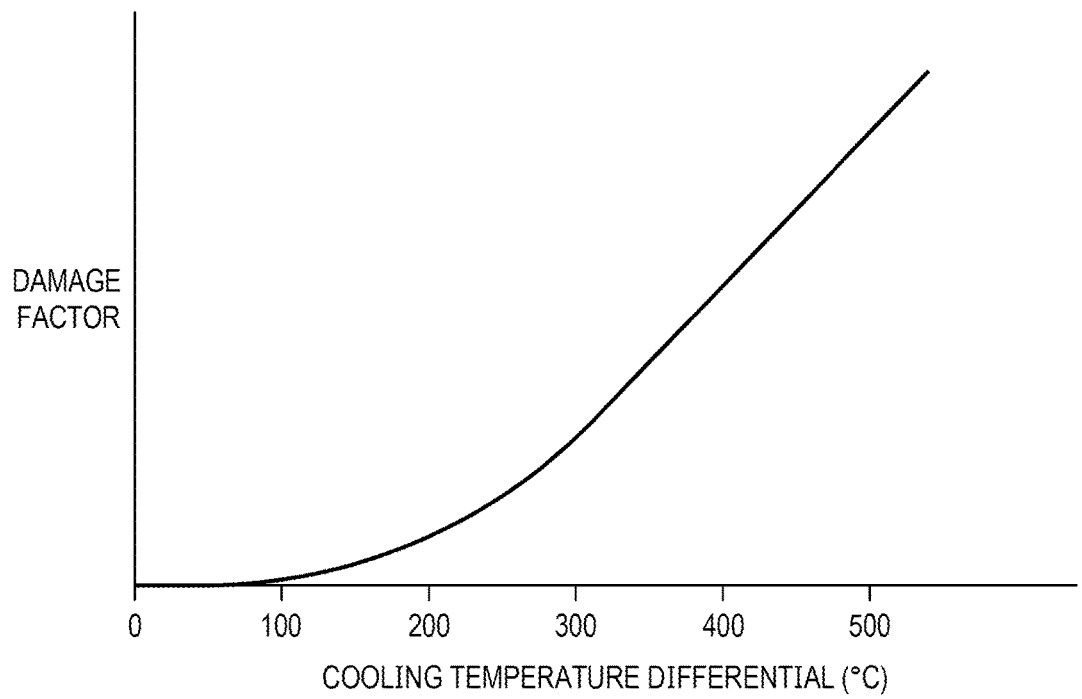
FIG. 6B is an illustration of the relationship between rock damage from drilling operations and a cooling temperature differential.

FIG. 6B shows the relationship between internal damage to the rock as a function of cooling temperature (for example, in drilling operations). Note that the internal damage is a separate and additional effect in addition to the embrittlement mechanism discussed earlier. A higher cooling temperature differential is required to cause irreversible damage within the rock as opposed to simple embrittlement. The irreversible damage is manifested as microcracks, fractures, and displacement among and between rock grains due to differential thermal contraction. With sufficient thermal cooling both embrittlement and subsequent irreversible damage can be induced to the rock being drilled.

Figure 7:
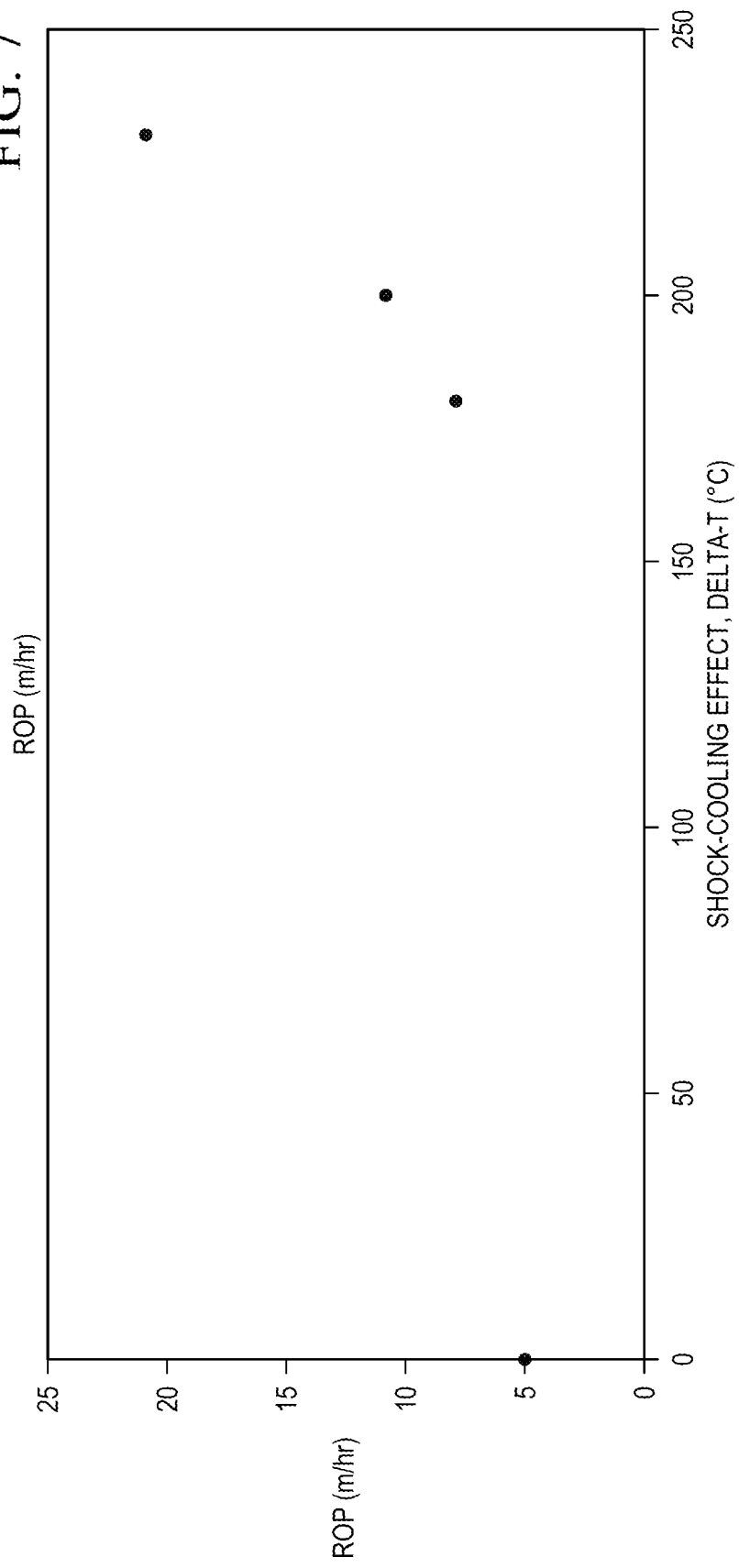
FIG. 7 is a graphical representation of results of laboratory tests of rate-of-penetration as a function of the difference in temperature between drilling fluid and the rock being drilled.

FIG. 7 is a graphical representation of results of laboratory tests of rate-of-penetration as a function of the difference in temperature between drilling fluid and the rock being drilled. The lab tests were carried out on blocks of granite 10" in diameter, which were heated in an oven to the target temperature. The blocks were then placed in a pressurized chamber that was pressurized to simulate about 1000 m depth, both with respect to confining pressure (applied to a sleeve surrounding the rock sample) and with respect to hydrostatic pressure of the drilling fluid. The rock samples were then drilled with consistent weight-on-bit, rpm, and flow rate using ambient temperature drilling fluid. As can be seen from FIG. 7, rate of penetration (ROP) increases substantially when the difference between the temperature of the rock being drilled and the temperature of the drilling fluid exceeds about 175 degrees Celsius. With such a temperature differential, the thermally induced stress in the rock at the rock face can be greater than the tensile strength of the rock at the rock face, which can weaken and cause cracks in the rock which increase rate of penetration. Further increases in the temperature differential have a greater improvement in ROP.

Furthermore, the shock cooling can reduce the effective lithostatic confining pressure at the rock face through thermal contraction. On bench-scale tests with no shock cooling, drilling typically has declining ROP with increasing confining pressure. Therefore the shock cooling effect by itself can enable improved performance in deep rocks under high confining pressure.

In some instances of the present disclosure, the difference between the inherent temperature of the rock adjacent the rock face and the temperature of the drilling fluid at the rock face is sufficient to induce embrittlement of the formation at the rock face. When an embrittled rock fails, it can break suddenly and without material plastic deformation.

In some instances of the present disclosure, the difference between the inherent temperature of the rock adjacent the rock face and the temperature of the drilling fluid at the rock face is sufficient to lower the tensile strength of the rock and/or to damage the rock microstructure (which can reduce the rock strength due to small microfractures and weaknesses within the rock matrix) and/or induce spalling at the rock face due to thermal contraction of the rock. In some instances of the present disclosure, the temperature difference is sufficient to reduce the confining pressure at the rock face (by thermally contracting the rock and inducing fractures). If thermal contraction occurs to the point where fractures are created in the rock face, it will lose confining pressure and become easier to break.

In some instances of the present disclosure, the difference between the inherent temperature of the rock adjacent the rock face and the temperature of the drilling fluid at the rock face is sufficient to keep the bottom hole assembly (BHA) cool and at a relatively constant temperature even when drilling rock at temperatures of 250° C. to 500° C. or higher, and at depths of 2-14 km or higher. Such cooling can be particularly advantageous in the case of electro-pulse drilling, as such technology inherently requires power generation and transmission in the BHA and electrical resistance increases with increasing temperature. Regardless of the rock-breaking method, some downhole electronics, circuit boards, batteries, and other components can have temperature limits of 150-200° C. (Some downhole components can have a different (higher or lower) temperature limit.) By using a cooling system of the present disclosure these components are kept below their temperature limits even when drilling very hot rock.

Likewise, by cooling the magnetometers and other downhole components of directional drilling systems, some instances described in the present disclosure can enable the use of directional drilling in higher temperature rock environments than was possible previously.

Thus, by providing a large temperature differential between the rock adjacent the rock face and the drilling fluid at the rock face, the enhanced cooling systems and methods disclosed herein can enable the use of a drilling system (such as an electro-pulse drilling) and directional drilling components to drill the multiple horizontal wells of a closed-loop geothermal system in a high-formation temperature environment (such as that illustrated in FIG. 1B), with better downhole electronics performance and higher ROP.

In some instances of the present disclosure, enhanced cooling can be used to drill all of the wellbores of the systems shown in FIGS. 1A and 1B. Because the highest-temperature rock can be encountered in the formations through which lateral wellbores 110 are drilled, in some instances of the present disclosure, conventional without advanced cooling can be used to drill the vertical well components of FIGS. 1A and 1B and enhanced cooling used to drill some or all of lateral wellbores 110. Shock-cooling can have a greater effect on ROP when the rock is hot, for example, above 250 C; therefore, enhanced cooling can be especially suited to wells where the majority of the drilling is within very hot rock. The ROP advantage can be reduced in a single vertical or deviated well, however the advantage can be significant if a network of wellbores is drilled at depth within hot rock, such as the examples shown in FIGS. 1A and 1B.

Figure 8B:
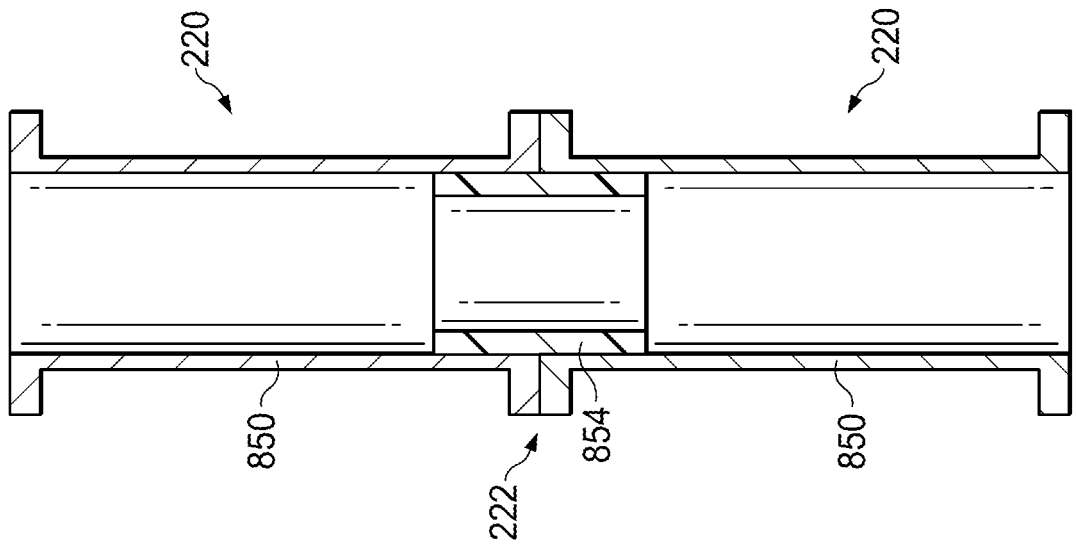
FIG. 8B is an illustration of coated tubing segments of a tubing string for drilling in accordance with the concepts herein.
Figure 8A:
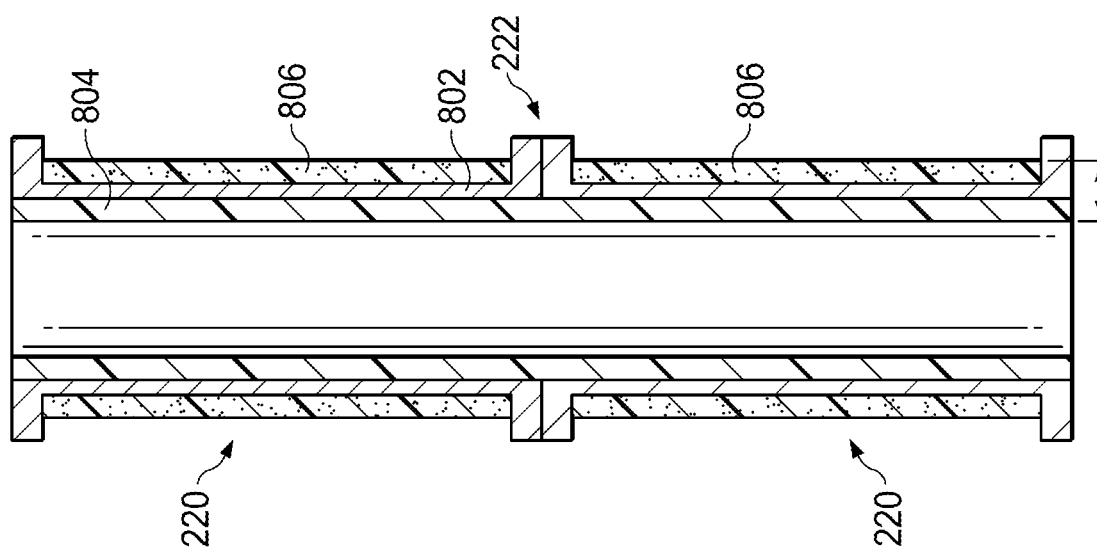
FIG. 8A is an illustration of coated tubing segments of a tubing string for drilling in accordance with the concepts herein.

FIG. 8A illustrates cooling coatings applied to tubular segments 220 of drill string 206 of FIG. 2 in accordance with an instance of the present disclosure. Tubular segments 220 are connected to each other at connection joints 222 and comprise a main body 802. In some instances of the present disclosure, main body 802 comprises a carbon steel body. In other instances of the present disclosure, main body 802 can comprise an aluminum alloy, a titanium alloy, and/or fiber composite (e.g., a composite of polymer binder with carbon fiber, aramid fiber, fiberglass, e-glass and/or other structural fiber), as described in more detail below. Inner coating layer 804 at least partially covers the inner circumferential surface of tubular segments 220. In the illustrated instance, inner coating layer covers the full length of tubular segments 220 and also the inner surface of connection joint 222. In some instances of the present disclosure, connection joints 222 can be a significant area of heat transfer. By covering the inner surface of connection joint 222 with inner coating layer 804, heat transfer at connection joint 222 is reduced.

Outer coating layer 806 at least partially covers the outer circumferential surface of the tubular segment 220. In the illustrated instance, connection joint 222 has a larger diameter than the main portion of body 802 and thus can be exposed to more contact and resulting greater friction against the wellbore wall or other components of the wellbore system. In the illustrated instance, outer coating layer 806 covers the portion of tubular segments 220 between connection joints 222 but not the larger diameter area around connection joints 222. In this way, outer coating layer 806 is less exposed to friction occurring at connection joints 222.

In some instances of the present disclosure, inner coating layer 804 comprises one or more of epoxy novolac resins, TK340XT and CP-2060, and epoxy phenolic resins, TK34XT and CP-2050. The TK products are available from NOV, Inc. while the CP products are available from Aremco products Inc. The thickness of inner coating layer 804 comprising the epoxy phenolic resin can range from 150 to 250 μm while the thickness inner coating layer 804 comprising the epoxy novolac resins can range from 400 to 1270 μm. The epoxy phenolic resins can have an average thermal conductivity of ~0.8 K/w m while the epoxy novolac resin can have an average thermal conductivity of ~0.4 k/w m. Insulating particles can be added to these resins, or others, to further reduce the thermal conductivity.

In some instances of the present disclosure, outer coating layer 806 comprises a fiber composite overwrap (such as carbon fiber, an e-glass composite and/or another fiber composite) overwrap of about 2540 μm thickness. These coatings are available from ACPT Inc., and/or Seal for Life Industries. E-glass can have a thermal conductivity of about 0.288 W/mk while carbon fiber can have a thermal conductivity of about 0.8 W/km.

In some instances of the present disclosure, a length normalized thermal resistance of a wall of the tubing string is at least about 0.002 meters kelvin per watt. In some instances of the present disclosure, a length normalized thermal resistance of a wall of the tubing string is at least about 0.01 meters kelvin per watt. Referring to FIG. 8A, the thickness 810 of the wall is defined by the inner surface of inner coating layer 804 and the outer surface of outer coating layer 806. For purposes of the present disclosure, "length normalized thermal resistance" is the effective conductive thermal resistance of the string for radial heat transfer, considering the varying materials along its length, and is the temperature difference required to transmit 1 watt of energy over an axial material length of 1 meter.

Below is the length normalized thermal resistance of the wall of the tubing string in some instances of the present disclosure having a steel inner body 802 and an inner coating layer 804 of the materials and thicknesses as indicated (but no outer coating layer 806):

| Coating layer | Length-normlized Thermal Resistance |
|---|---|
| TK34 (100 μm) | 0.00062 |
| TK34 (250 μm) | 0.0010 |
| TK340XT (250 μm) | 0.0017 |
| TK340XT (400 μm) | 0.0024 |

Below is the length normalized thermal resistance of the wall of the tubing string in some instances of the present disclosure having a steel inner body 802 and an inner coating layer 804 of the materials and thicknesses as indicated plus an outer coating layer 806 ("jacket") of e-glass of a thickness as indicated:

| Coating layers | Length-normalized Thermal Resistance |
|---|---|
| TK34 (100 μm) + 2.5 mm jacket | 0.0032 |
| TK34 (100 μm) + 5 mm jacket | 0.0034 |
| TK34 (250 μm) + 2.5 mm jacket | 0.0048 |
| TK34 (250 μm) + 5 mm jacket | 0.0054 |
| TK340XT (250 μm) + 2.5 mm jacket | 0.0070 |
| TK340XT (250 μm) + 5 mm jacket | 0.0082 |
| TK340XT (400 μm) + 2.5 mm jacket | 0.0092 |
| TK340XT (400 μm) + 5 mm jacket | 0.011 |

In an instance of the present disclosure, drill string 206 of FIG. 2 comprises tubular segments 220 as illustrated in FIG. 8A comprising inner coating layer 804 of an epoxy novolac resin TK340XT with a thickness of about 400 microns and an e-glass outer coating layer 806 with a thickness of about 5 millimeters. In such an instance, assuming a subterranean zone with a thermal gradient of about 60° C./km and drill string with a length of about 8,000 m and water-based drilling fluid with a circulation rate of about 3 m³/min, and a temperature at the rock face of about 490° C., such a drill string 206 comprised of such tubing segments 220 can result in a temperature difference between the rock adjacent the rock face and the drilling fluid at the rock face of about 346° C.

In another instance of the present disclosure, drill string 206 of FIG. 2 comprises tubular segments 220 as illustrated in FIG. 8A comprising inner coating layer 804 of an epoxy novolac resin TK34XT with a thickness of about 250 microns and a e-glass outer coating layer 806 with a thickness of about 2.5 millimeters. In such an instance, assuming a subterranean zone with a thermal gradient of 40° C./km and tubing string with a length of about 9,000 m and water-based drilling fluid with a circulation rate of about 3.5 m³/min and a temperature at the rock face of about 370° C. such a drill string 206 comprised of such tubing segments 220 can result in a temperature difference between the rock adjacent the rock face and the drilling fluid at the rock face of about 196° C.

In other instances of the present disclosure, inner coating layer 804 and/or outer coating layer 806 can have a greater or lesser thickness and/or can comprise other types of coatings, for example, ceramic inorganic coatings such as silicate-bonded ceramics.

FIG. 8B illustrates cooling coatings applied to tubular segments 220 of a drill string 206 of FIG. 2 in accordance with another instance of the present disclosure. In the instance shown in FIG. 8B, tubing segments 220 are composite pipe segments comprising a composite main body 850 (which can be made of steel, titanium, aluminum, fiber composite, or another suitable material) connected at connection joints 222 which likewise can comprise steel, titanium, aluminum, fiber composite, or another suitable material.

Referring to FIG. 8B, inner coating layer 854 at least partially covers an inner circumferential surface of tubular segments 220. In the illustrated instance, inner coating layer 854 covers only the inner circumferential surface of tubular segments 220 at and proximate to connection joint 222. By covering the area of inner circumferential surface of segment 220 at and proximate to connection joint 222 with inner coating layer 854, heat transfer at connection joint 222 is reduced. In other instances of the present disclosure, inner coating layer 854 covers the entire inner circumferential surface of tubular segments 220.

In some instances of the present disclosure, inner coating layer 854 of FIG. 8B can comprise the same materials and thicknesses as described in reference to inner coating layer 804 of FIG. 8A. In some instances of the present disclosure, inner coating layer 854 can comprise other suitable materials or thicknesses. In some instances of the present disclosure, tubing segments 220 can comprise vacuum-insulated tubing (VIT) wherein insulation is provided by a vacuum layer within tubing segment 220, instead of or in addition to inner coating layer 804 (or 854) and outer coating layer 806.

In some instances of the present disclosure, main body 802 and/or main body 850 can comprise a high strength-to-weight ratio steel drill pipe such as UD165 steel drill pipe available from NOV, Inc. In some instances of the present disclosure, such steel drill pipe can be UD-165 steel drill pipe that can have a yield strength of about 165,000 psi (1,138 MPa), a tube tensile strength of about 1,000,000 lbf (4.45 MN), a length normalized joint air weight of 24.76 lbf/ft (361.3 N/m), and a joint strength to weight ratio of about 900 lbf/lbf (900 N/N) in a 5.875 inch (14.92 cm) outer diameter drill pipe.

In some instances of the present disclosure, main body 802 and/or main body 850 can comprise a drill pipe made of a titanium alloy. In some instances of the present disclosure, such titanium alloy drill pipe can comprise Ti-6Al-4V titanium alloy and can have a yield strength of about 120,000 psi (827 MPa), a tube tensile strength of about 750,000 lbf (3.34 MN), a length normalized joint air weight of 16 lbf/ft (233.8 N/m), and a joint strength to weight ratio of about 1,000 lbf/lbf (1000 N/N) in a 5.875 inch (14.92 cm) outer diameter drill pipe.

In some instances of the present disclosure, main body 802 and/or main body 850 can comprise a drill pipe made of an aluminum alloy. In some instances of the present disclosure, such an aluminum alloy drill pipe can comprise Al—Zn—Mg II aluminum alloy and can have a yield strength of about 70,000 psi (483 MPa), a tube tensile strength of about 600,000 lbf (2.67 MN), a length normalized joint air weight of 15.5 lbf/ft (226 N), and a joint strength to weight ratio of about 825 lbf/lbf (825 N/N) in a 5.787 inch (14.699 cm) outer diameter drill pipe. In some instances, such an aluminum alloy pipe can comprise FarReach™ drill pipe available from Alcoa Energy Systems. In some instances of the present disclosure, such aluminum alloy drill pipe can comprise aluminum drill pipe available from Aluminum Drill Pipe, Inc.

In some instances of the present disclosure, main body 802 and/or main body 850 can comprise a carbon fiber composite drill pipe. In some instances of the present disclosure, such carbon fiber composite drill pipe can comprise Advance Composite Drill Pipe available from Advance Composite Products & Technology, Inc.

In some instances of the present disclosure, drill string 206 of FIG. 2 can comprise tubular segments 220 each comprising main bodies 802 and/or 250 of steel, titanium, aluminum, and/or fiber composite as described above. For example, in some instances of the present disclosure, each segment of drill string 206 comprises main bodies 802 and/or 250 of a single material, such as aluminum alloy. In other instances of the present disclosure, drill string 206 may comprise different portions, each comprising a plurality of segments 220 comprised of a different material. For example, in some instances of the present disclosure, some of the tubing segments 220 of drill string 206 can comprise one main body material (such as aluminum alloy) and the remainder of the tubing segments 220 of drill string 206 can comprise another main body material (such as steel). In some instances of the present disclosure, drill string 206 can comprise two, three or more portions, each of which comprises tubing segments 220 with main bodies comprised of materials different than the other portions. In another instance, a majority of the segments 220 in a portion close to the drilling bit 208 comprise main bodies of a material lighter than the portion further uphole from drilling bit 208, on a length-normalized air weight basis. For the examples above, titanium drill pipe is about 35% lighter than steel and aluminum drill pipe is about 37% lighter. Those segments 220 in a portion further uphole from drilling bit 208 may comprise main bodies with a higher strength material. For the examples above, UD-165 drill pipe has a tensile strength about 67% greater than aluminum, and titanium drill pipe has a tensile strength about 25% greater than aluminum. The difference in tensile strength and length-normalized weight can also be achieved with a single material, but with varying thicknesses/diameter of drill pipe in the uphole portion compared to the downhole portion in a telescoping manner. In one instance of the present disclosure, the majority of the segments 220 in the portion close to the drilling bit are about 35% lighter than the majority of the segments 220 in the uphole portion, and a majority of the segments 220 in the uphole portion have a tensile strength are about 25% higher than a majority of the segments 220 in the portion close to the drilling bit. Such use of different drill string materials can enable drilling of much higher temperature rocks which exist at greater depths, and hence require an insulated drill string which has sufficient tensile strength to extend to such depths. The above mentioned materials, when combined appropriately, enable drilling at depths of greater than 9 km, including up to 14 km or greater. The earth's geothermal gradient causes rocks at greater depths to have higher temperatures. The present shock cooling technology provides a method to increase rate of penetration and drilling performance in high temperature rock. Hence there is a synergistic effect from combining deeper drilling, enabled by combining different weight/strength drill pipe segments, with the cooling technology described herein. The closed-loop multilateral wells can be drilled at a sufficient depth (and hence, rock temperature) so that the shock-cooling effect is enabled, thus greatly reducing the time and cost of drilling the multilateral wellbores.

Figure 9A:
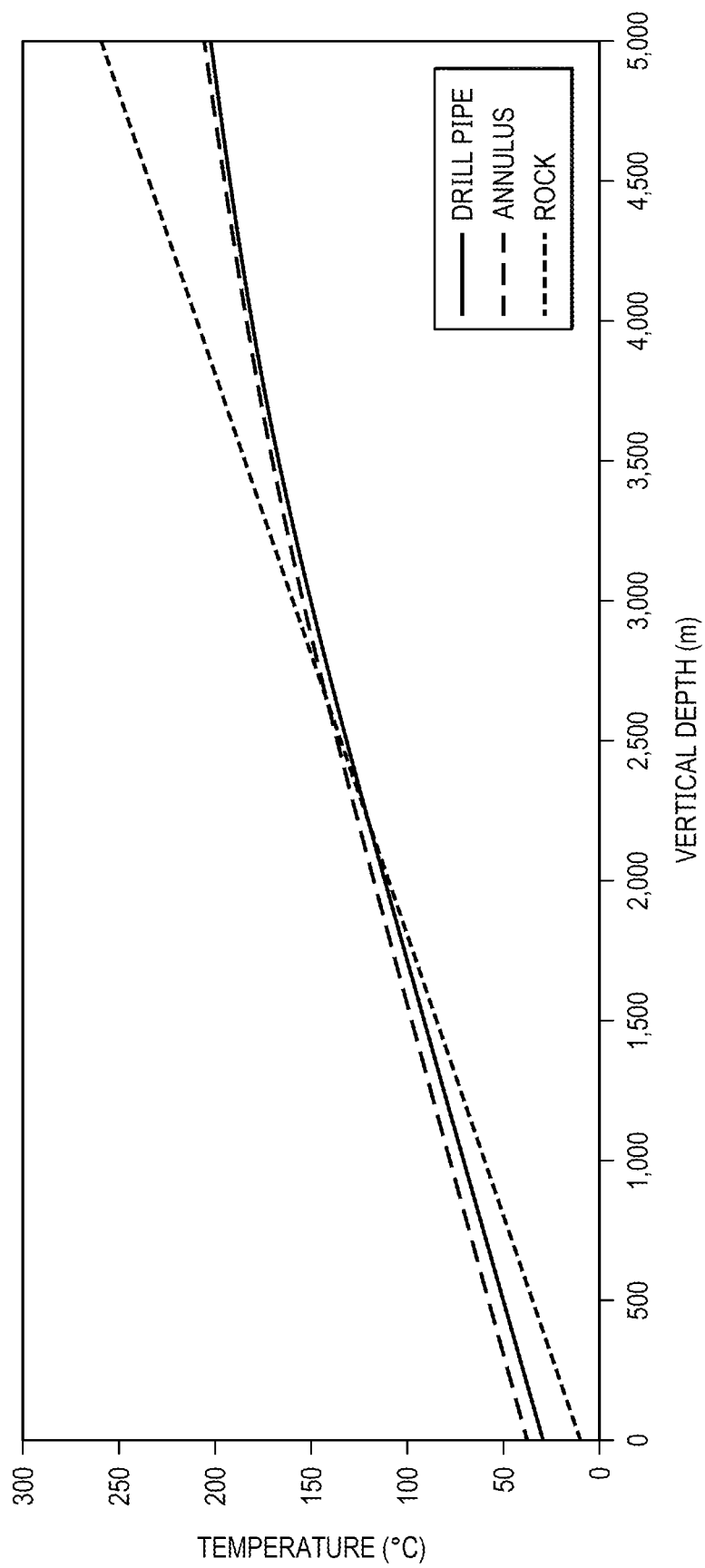
FIGS. 9A-9D are illustrations of the relationship between vertical depth and temperature of drill pipe, annulus, and rock with tubing segments with different coating configurations in accordance with the concepts herein.

FIG. 9A illustrates the results of a thermodynamic simulation of heat transfer in fluids flowing in a downhole tubular drill string comprising standard carbon steel pipe within a cased wellbore within a subterranean zone. The simulation assumes a water drilling fluid pumped at 3.5 cubic meters per minute down the tubular string and a temperature gradient from the surface (i.e., from the surface location at the uphole end of the wellbore) to the rock face (at the downhole end of the wellbore) of 50° C./km. Referring to FIG. 9A, the curve labeled "Drill Pipe" is the temperature of the fluid flowing within the tubular drill string at a given depth, the curve labeled "Annulus" is the temperature of the fluid flowing within the annulus between the tubing and the casing at a given depth, and the curve labeled "Rock" is the inherent temperature of the rock at a given depth. As shown in FIG. 9A, some insulation is provided against the heat transfer, such that, at the bottom of the well, the temperature of the fluid at the rock face is approximately 206° C., while the rock temperature is 260° C., representing a temperature difference of about 54° C. However, such a temperature difference may be insufficient to provide a sufficiently cold flow of drilling fluid to cool downhole electronics or directional drilling equipment or to provide for a shock-cooling effect at the rock face or other advantages of flowing cool drilling fluid for drilling at the downhole end of the wellbore as described above. In FIG. 9A, temperature of the fluid at the rock face is equal to the annulus temperature at the bottom of the well, after fluid has exited the drilling bit.

Figure 9B:
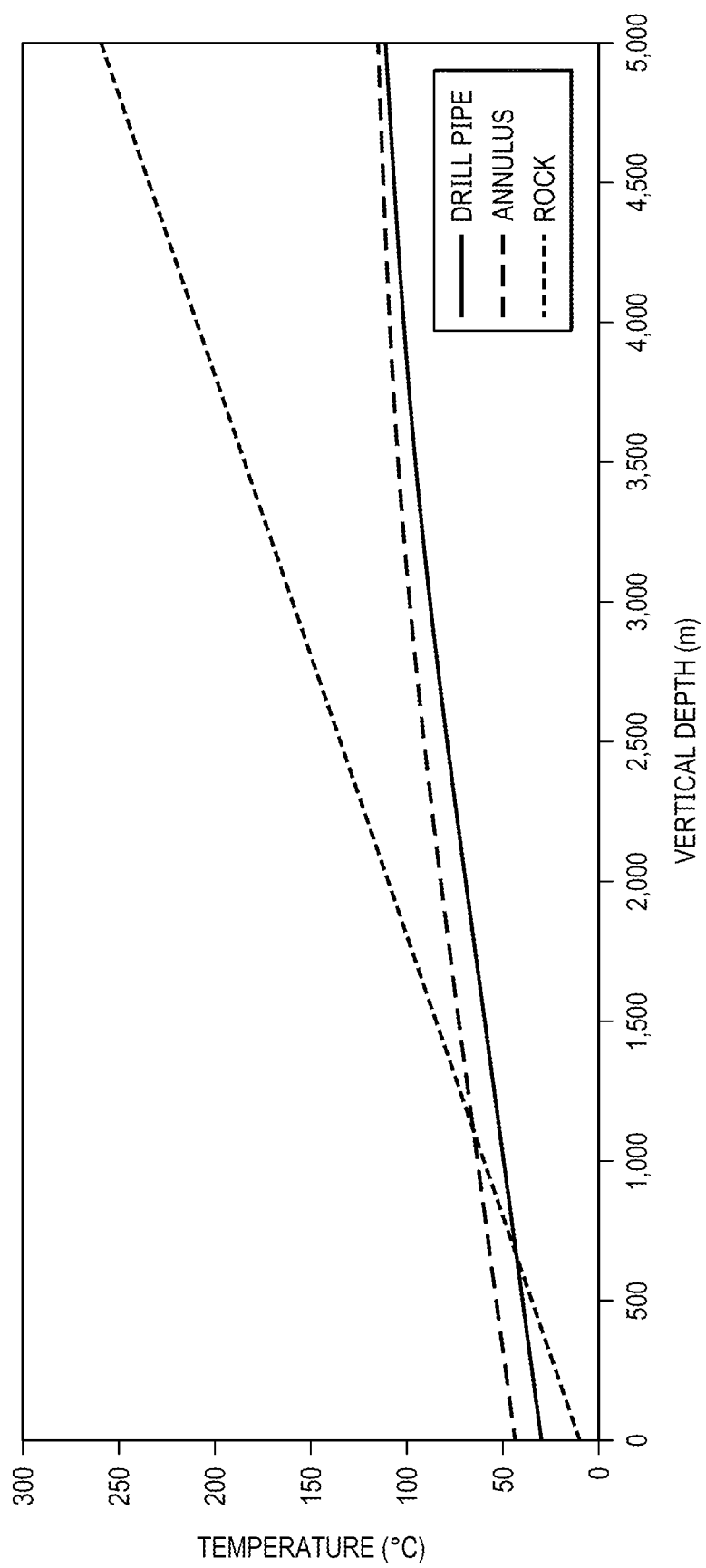
Figure 9C:
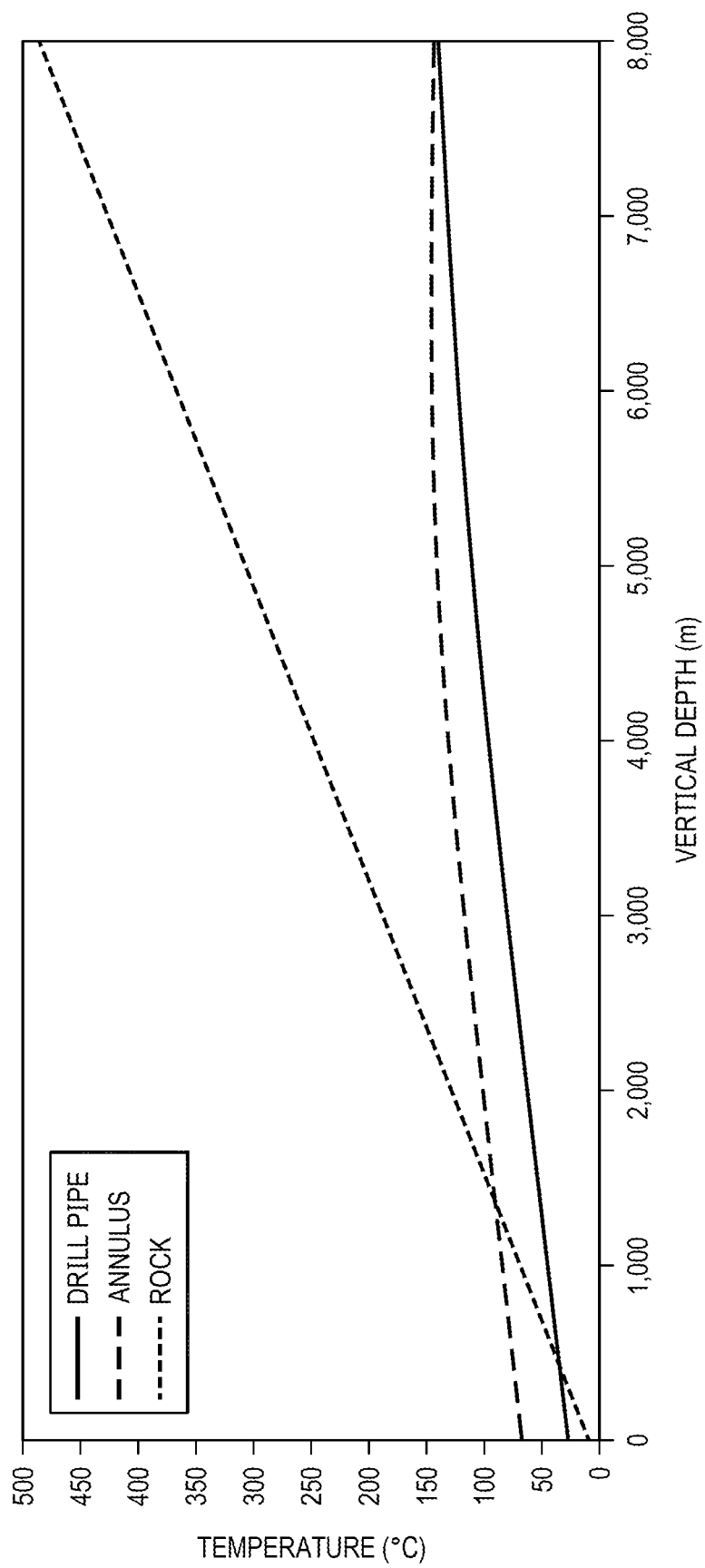
Figure 9D:
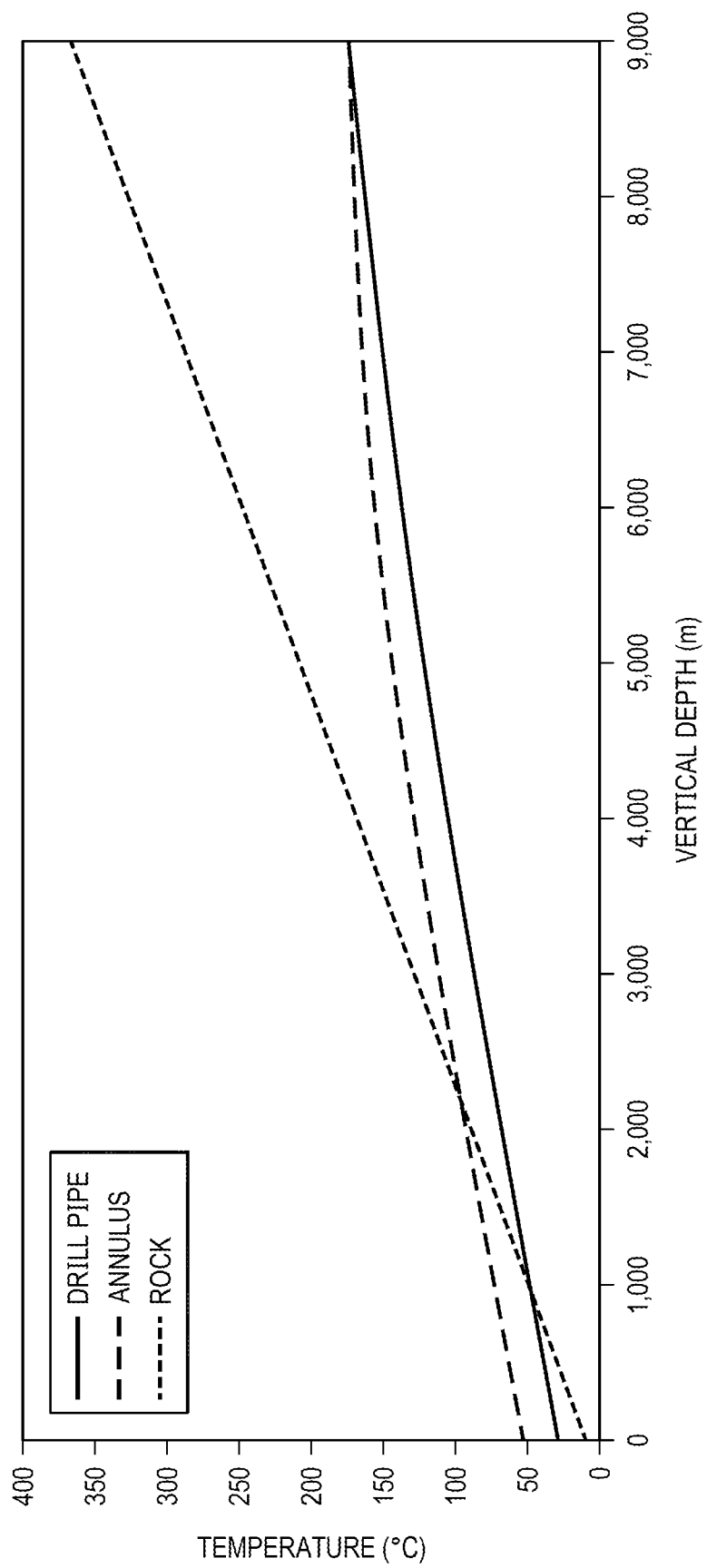

The coatings and coating geometries described in reference to FIGS. 8A and 8B can reduce heat exchange between the colder fluid descending the tubing string and the hotter fluid returning in the annulus while drilling, and can result in a difference between the inherent temperature of the rock adjacent the rock face and the temperature of the drilling fluid at the rock face of at least 100° C. even in geothermal environments where an inherent temperature of the rock adjacent the rock face is at least 250° C. For example, FIGS. 9B-9D illustrate the results of a thermodynamic simulation of heat transfer to a downhole tubular, assuming tubular segments as illustrated in FIG. 8A, in various instances of the present disclosure as described below. In the simulations illustrated in FIGS. 9B-9D, the inner coating layer 804 covers the full length of the tubular segments including the inner surface of the connection joints. In FIGS. 9B—9D, the curve labeled "Tubing" is the temperature of the fluid flowing within the tubular drill string at a given depth, the curve labeled "Casing" is the temperature of the fluid flowing within the annulus between the drill pipe tubing and the casing at a given depth, and the curve labeled "Rock" is the inherent rock temperature at a given depth. Drilling fluid flows into the tubing at surface, through the BHA, through the drilling bit, past the rock face and into the annulus. The temperature of the drilling fluid at the rock face is approximately equal to the temperature of the fluid within the annulus at the bottom of the well.

FIG. 9B illustrates a thermodynamic heat transfer simulation for an instance comprising standard carbon steel pipe with an interior coating 804 comprising a 400 μm thickness of epoxy novolac TK340XT (and no exterior coating 806). The simulation assumes a water drilling fluid pumped at about 3.5 cubic meters per minute and a temperature gradient from the surface of the earth to the rock face of about 50° C./km. As shown in FIG. 9B, this instance provides an increased temperature differential as compared to FIG. 7; i.e., about 91° C. at 5000 meters.

FIG. 9C illustrates a thermodynamic heat transfer simulation for an instance comprising standard carbon steel pipe with an interior coating 804 comprising a 400 μm thickness of epoxy novolac TK340XT and an exterior coating 806 comprising a 5 mm e-glass jacket. The simulation assumes a water drilling fluid pumped at about 3 cubic meters per minute and a temperature gradient from the surface to the rock face of about 60° C./km. As shown in FIG. 9C, this instance provides a temperature differential of about 346° C. at 8000 meters.

FIG. 9D illustrates a thermodynamic heat transfer simulation for an instance comprising standard carbon steel pipe with an interior coating 804 comprising a 250 μm thickness of epoxy novolac TK34 and an exterior coating 806 comprising a 2.5 mm e-glass jacket. The simulation assumes a water drilling fluid pumped at about 3.5 cubic meters per minute and a temperature gradient from the surface to the rock face of about 40° C./km. As shown in FIG. 9D, this instance provides a temperature differential of about 196° C. at 9000 meters.

Figure 10:
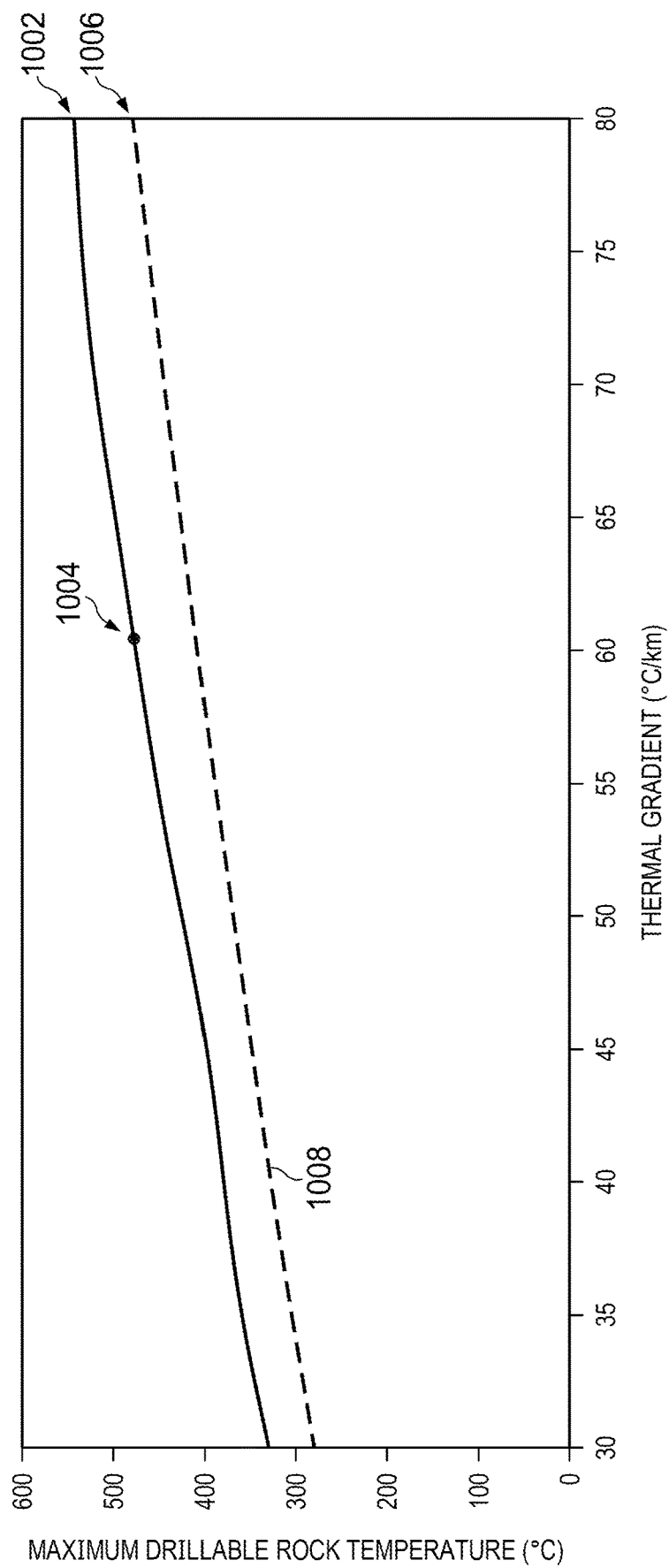
FIG. 10 is an illustration of the relationship between maximum drillable rock temperature and thermal gradient for different tubular segment coating configurations in accordance with the concepts herein.

FIG. 10 illustrates maximum rock temperature at which a well can be drilled for the instances described in reference to FIGS. 9C and 9D, as a function of the thermal gradient from the surface of the earth to the rock face (at the downhole end of the wellbore), assuming that the temperature of the drilling fluid exiting the drilling bit at the rock face should not exceed about 150° C. Upper curve 1002 corresponds to the instance described in reference to FIG. 9C. For example, at point 1004, the temperature gradient is about 60° C./km and the maximum drillable rock temperature is about 483° C., using the instance described in reference to 9C. Lower curve 1006 corresponds to the instance described in reference to FIG. 9D. For example, at point 1008, the temperature gradient is about 40° C./km and the maximum drillable rock temperature is about 335° C., using the instance described in reference to 9D.

In some instances of the present disclosure, instead of or in addition to coating layers 804 and 806 on tubular segments 220, a phase-change material such as water ice or dry ice can be added to the drilling fluid of a drilling system (for example, the drilling fluid 212 of FIG. 2). The phase-change materials can absorb thermal energy as it undergoes a phase change (for example, melts). In some instances of the present disclosure, the drilling fluid can be pumped at a sufficient flow rate so that the phase-change materials undergo a phase change proximate to the drilling bit.

In some instances of the present disclosure, a heat exchanger can be added to the system of FIG. 2 to cool drilling fluid 212 as it returns from wellbore 202 and is recirculated downhole. In some instances of the present disclosure, such a heat exchanger can be positioned at a surface location.

All of the drilling fluid does not necessarily have to flow through the drilling bit to achieve the results described herein. A portion of the drilling fluid may also pass from the tubing into the annulus through a port or other device located near the bit or near the BHA. Such a configuration may enable a higher flow rate if components within the bottom hole assembly have flow restrictions.

Figure 11:
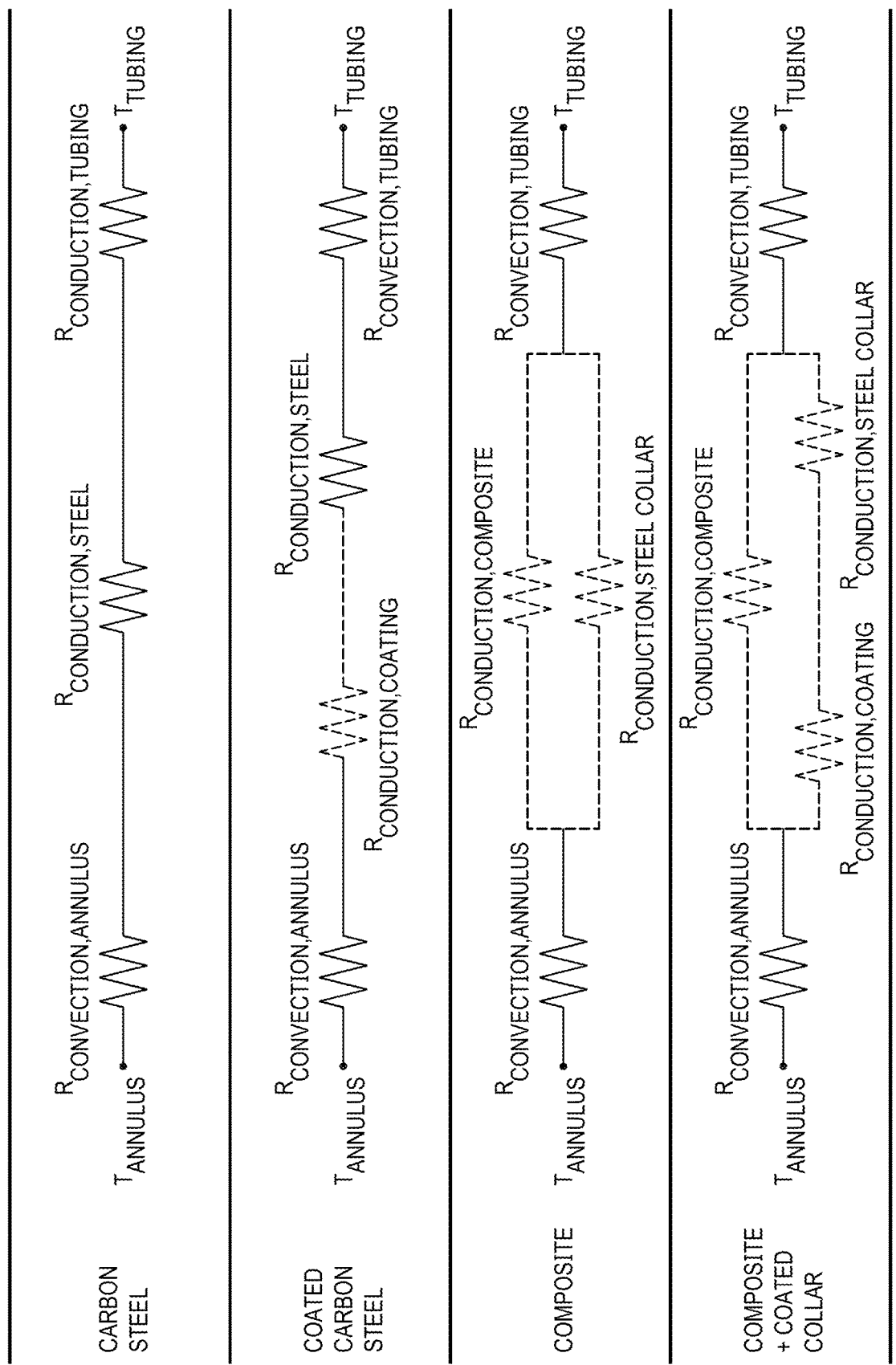
FIG. 11 is a schematic representation of the resistance to heat transfer through the annulus and different configurations of tubing in accordance with the concepts herein.

FIG. 11 illustrates the resistance to heat transfer, i.e., thermal resistance, through the annulus and four different configurations of tubing. When cool drilling fluid is circulated downhole through the tubing and back up through the annulus, the drilling fluid in the annulus is heated by the surrounding rock of the subterranean zone to $T_{ANNULUS}$. The drilling fluid in the annulus, in turn, heats the drilling fluid in the interior of the tubing to $T_{TUBING}$. In each instance, the primary heat transfer mechanism through the drilling fluid filled annulus is convection. The flowing drilling fluid, an imperfect convective media, presents a thermal resistance $R_{CONVECTION, ANNULUS}$. In the case of a section of uninsulated carbon steel tubing (CARBON STEEL), the steel is an imperfect conductive media, and presents an additive (series) thermal resistance $R_{CONDUCTION, STEEL}$. Finally, the primary heat transfer mechanism within the drilling fluid filled tubing, heating the flowing drilling fluid itself, is convection. The drilling fluid presents an additive (series) thermal resistance $R_{CONVECTION, TUBING}$. When the tubing is fully covered by an insulative coating (COATED CARBON STEEL), the coating represents an additive (series) thermal resistance $R_{CONDUCTION, COATING}$. When composite tubing with steel collars (joints) is used (COMPOSITE and COMPOSITE+COATED COLLAR), the composite tubing and the carbon steel present parallel thermal resistances ($R_{CONDUCTION, COMPOSITE}$ and $R_{CONDUCTION, STEEL COLLAR}$, respectively). In other words, the material with the lower thermal resistance (i.e., the less insulative material) has a greater influence on the total thermal resistance of the tubing segment. As composite typically has a higher thermal resistance than steel, coating just the steel collars can yield a significant increase to the total thermal resistance of the tubing segment.

Figure 12:
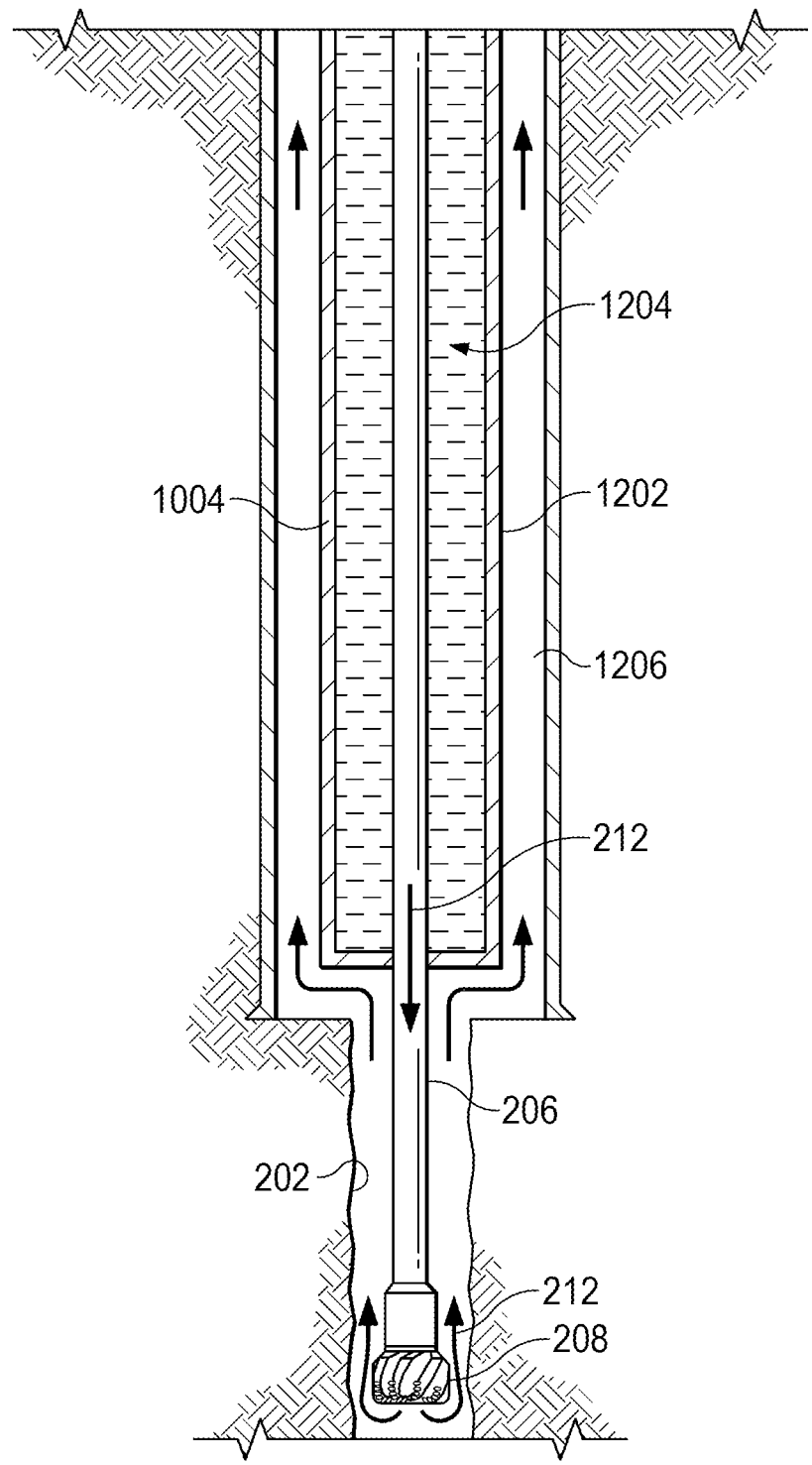
FIG. 12 is a schematic illustration of a wellbore system with a second insulating annulus in accordance with the concepts herein.

FIG. 12 illustrates the creation of a second insulating annulus in accordance with an instance of the present disclosure. The instance of the present disclosure described in reference to FIG. 12 will be described in reference to the components of drilling system 200 of FIG. 2. Referring to FIG. 12, wellbore 202 is being drilled using a drilling bit 208 at the downhole end of a drill string 206. Drilling fluid 212 flows down drill string 206 and out drilling bit 208. Annulus 216 is defined in the lower portion of wellbore 202 as being between the exterior of drill string 206 and wellbore 202. An intermediate tubular string 1202 is positioned within the wellbore, such that drill string 206 is positioned within intermediate tubular string 1202, thereby forming an inner annulus 1204 between the exterior of drill string 206 and the interior of intermediate tubular string 1202 and an outer annulus 1206 between the exterior of intermediate tubular string 1202 and wellbore 202, each of inner annulus 1204 and outer annulus 1206 extending downhole at least partially along the length of drill string 206. In some instances of the present disclosure, inner annulus 1204 can be filled with an insulating material. In some instances of the present disclosure, the insulating material is a gas, thereby creating a "gas blanket." In other instances of the present disclosure, inner annulus 1204 can be filled with foam or insulating oil or any fluid or material that has a low thermal conductivity, instead of or in addition to a gas.

Figure 13A:
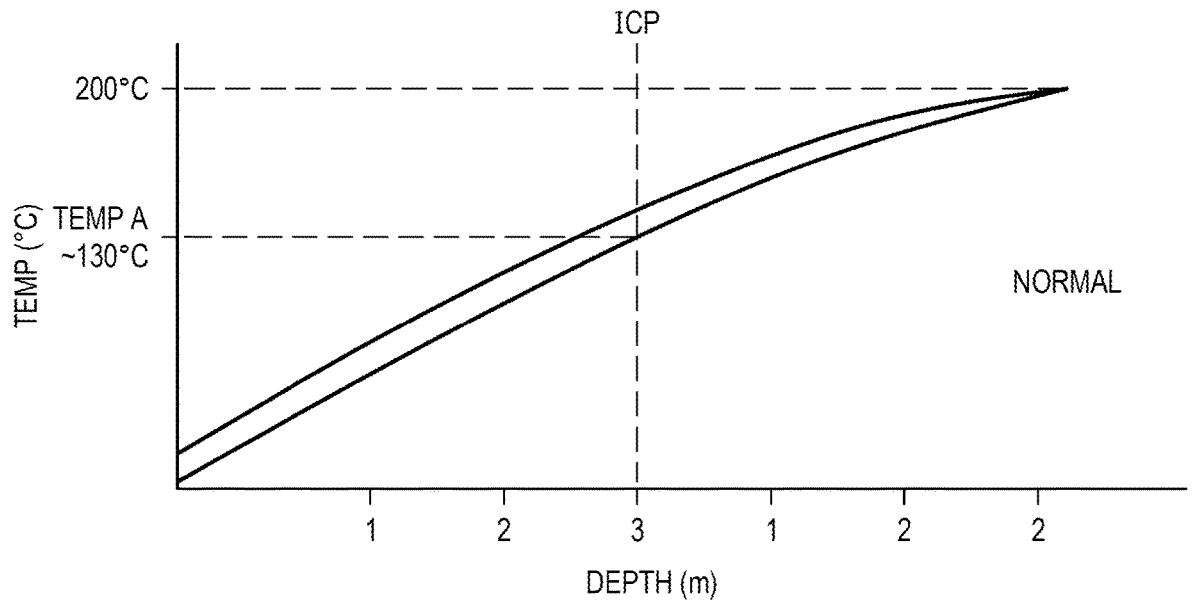
FIGS. 13A-13B is in illustration of the heat effect of the second insulating annulus of FIG. 12.
Figure 13B:
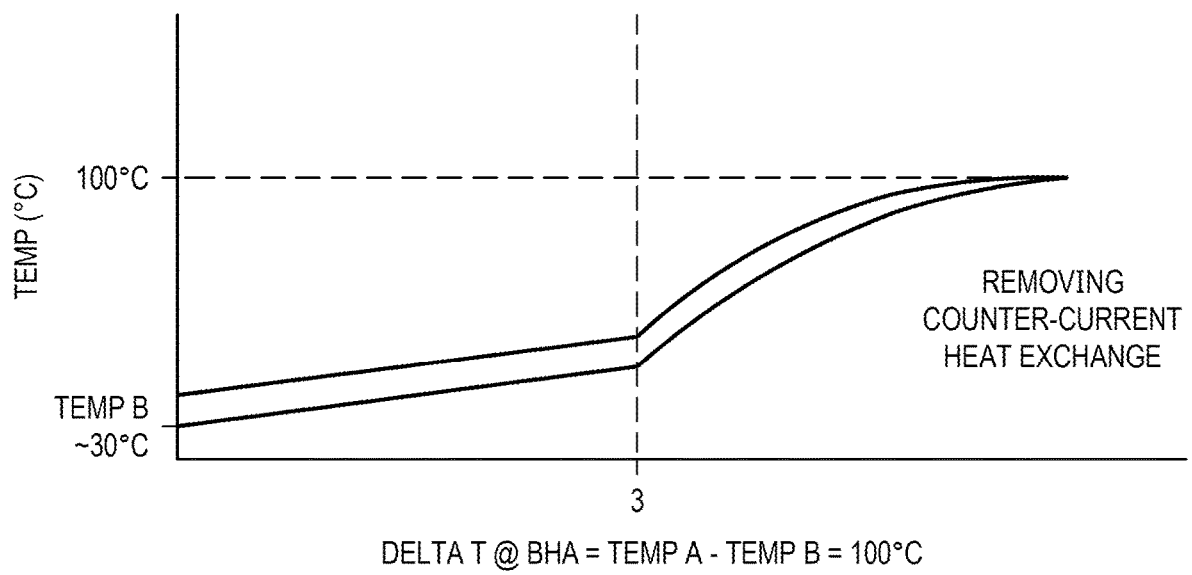

Inner annulus 1204 insulates the downward flowing drilling fluid 212 from the heated, upward flowing fluid in the outer annulus 1206. FIGS. 13A and 13B are a comparison of wellbore fluid temperatures in a well system. FIG. 13A illustrates predicted drilling fluid temperatures with depth in a drilling system without an insulating intermediate tubular string, and FIG. 13B illustrates drilling fluid temperatures with depth in a drilling system with an insulating intermediate tubular string providing an inner annulus filled with an insulating gas as described in reference to FIG. 12. Although the bottom portion of the well continues to heat up with no insulation below the bottom of the gas blanket, the temperature at the rock face is still cooled dramatically. The inner annulus 1204 in this example only extends to the bottom of the last casing string, however, substantial cooling is still achieved at the rock face (of a main wellbore and/or a lateral drilled from a main wellbore). The insulating fluid blanket remains in place due to the much lower density and thus it essentially floats on top of the drilling fluid.

Due to the lower density of the "blanket fluid", it is pressurized at the wellhead on surface (not shown). Managed pressure drilling (MPD) technology is a system that maintains pressure in an annulus around a rotating drill pipe. The key challenge is to seal off fluid from leaking past the rotating pipe. MPD systems have recently improved enough to hold the pressurized fluid blanket in place. Therefore, if the fluid blanket is filling the inner annulus concentric to a rotating drill-pipe, a modern MPD system can preferably be used.

A variant of this is to install another casing string to create two inner annuli (not shown). An inner annulus is positioned concentric and adjacent to a rotating drill pipe, a secondary inner annulus which can be filled with the blanket fluid, and an outer annulus where heated drilling fluid is returning. This set-up requires the costs and complications of a larger borehole to make room for the additional annulus, however it avoids the use of a high pressure MPD system since the inner annulus can be filled with drilling fluid.

Figure 14:
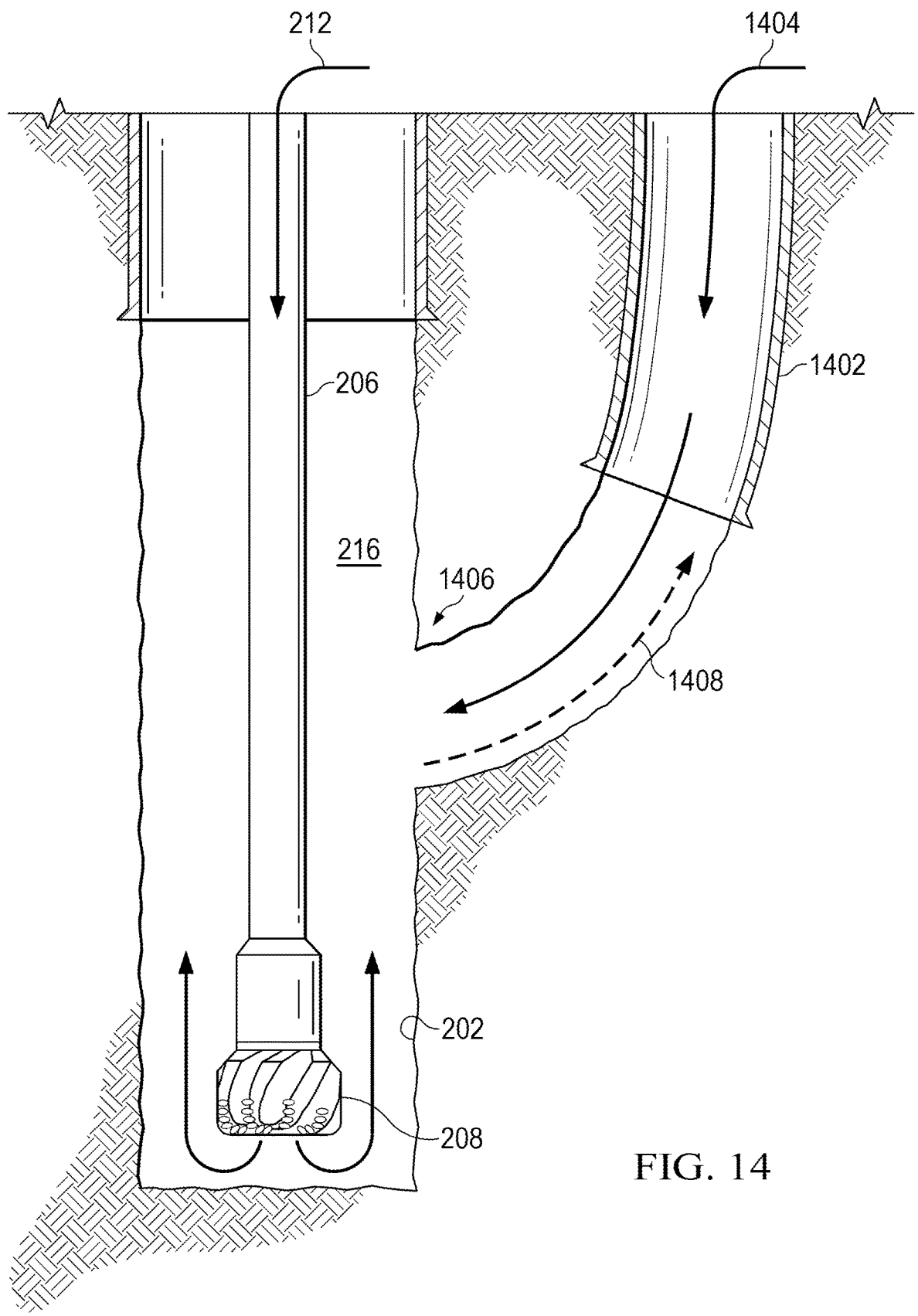
FIG. 14 is a schematic illustration of a wellbore system for drilling with a second well serving as an inlet and/or outlet of drilling fluid in accordance with the concepts herein.

In accordance with an alternate instance of the present disclosure to reduce counter-current heat transfer from annulus to tubing is to use a second well which serves as an inlet and/or outlet of drilling fluids. FIG. 14 shows a schematic of this "slipstream well".

Referring to FIG. 14, as also described in reference to FIG. 2, wellbore 202 is being drilled using a drilling bit 208 at the downhole end of a drill string 206. Drilling fluid 212 flows down drill string 206 to drilling bit 208. Annulus 216 is defined between the exterior of the tubing string and wellbore 202. Wellbore 202 can comprise a main wellbore and/or a lateral wellbore.

In the instance illustrated in FIG. 14, wellbore 202 is a first wellbore, and a second wellbore 1402 is drilled to intersect with first wellbore 202. A second stream 1404 of drilling fluid is flowed down second wellbore 1402. Second drilling fluid stream 1404 provides at least a portion of the drilling fluid flowing at the downhole end of wellbore 202 i.e., at the rock face proximate to drilling bit 208. Second wellbore 1402 is sufficiently far from first wellbore 202 to reduce or eliminate heat transfer, such that second drilling fluid stream 1404 provides additional cooling at the downhole end of wellbore 202.

In some instances of the present disclosure, the drilling fluid and cuttings can be directed to return up second wellbore 1402 to the surface. In this variation, there is no upward flow of heated fluid into annulus 216 and thus counter-current heat exchange is eliminated above the intersection point 1406. This directional flow is denoted in dashed line by numeral 1408.

It will be appreciated that second wellbore 1402 can be drilled and utilized to cool any number of additional wellbores/conduits from the surface location. For example, a closed-loop geothermal well system can be constructed by drilling four corner wells. After one of the four corner wells is completed drilling, the "slipstream" intersecting section is plugged and abandoned, and another intersecting segment is drilled to intersect another of the corner wells. In this fashion, a single well can be used several times over to cool other wells and only the interconnecting segment needs to be drilled each time.

Shock-cooling hot rock with the techniques described herein may lead to several challenges in the drilling process behind the bit. Cooling increases the wellbore compressive strength yet reduces the tensile strength. The significant temperature difference between the circulating drilling fluid and the wellbore wall may cause cooling-induced tensile fractures radially away from the wellbore. These tensile fractures may have to be sealed or controlled with wellbore strengthening materials such as graphite or calcium carbonate, or other loss circulation material. Further, the fractures may have to be sealed with a sealant chemistry, for example sodium-silicate or potassium silicate. Operating the drilling process underbalanced is another method that may be used in isolation or in conjunction with the other techniques disclosed to mitigate the effects of tensile fractures behind the bit. A system design especially suited for electro-pulse drilling would be to utilize a Managed Pressure Drilling system and an oil-based drilling fluid with high electrical resistance and an equivalent circulating density below hydrostatic. This would enable flexibility in controlling downhole pressure yet still supplying a suitable drilling fluid for electrocrushing.

Another challenge associated with shock-cooling is the potential for induced tensile fractures to propagate into shear fractures or create further complexity, resulting in significant cuttings or sloughing of variable sized rock fragments from the wellbore wall behind the bit. Coupling the other methods with a viscous drilling fluid and high flow rate (>2.5 m3/min) can remove the extra fragments generated through the shock-cooling process. In some instances of the present disclosure, the drilling fluid can have a Marsh funnel viscosity of at least 80 to 100 seconds. Various slugs or sweeps of high viscous fluid volumes through the system will also assist in removing the extra fragments. Successful circulation of larger fragments to the surface can be a function of two main parameters: annular fluid velocity (driven by flow rate and annular capacities) and fluid rheology (plastic viscosity/yield point (PV/YP) to add carrying capacity/reduce slip velocity, and gel strength to suspend while making connections). Circulation of low-volume/high-viscosity sweeps on a regular basis can transport and suspend large fragments to the surface. In some instances of the present disclosure, the fragments can be caught (i.e., filtered and removed) at the surface to prevent or reduce contamination of the base drilling fluid.

By reducing heat exchange between the colder fluid descending the tubing string and the hotter fluid returning in the annulus while drilling, the coatings and coating geometries described in reference to FIGS. 8A and 8B, and the methods and systems described in reference to FIGS. 12 and 14 can also reduce the negative impact of higher formation temperatures on the tensile strength and other properties of the tubing segments of the tubing string (such as tubular segments 220 of drill string 206 of FIG. 2).

The above-described methods, systems, and apparatus for enhanced cooling of drilling fluid for can be used alone or in combination with each other.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A method for forming a geothermal well system, the method comprising:
   in a formation in a subterranean zone, forming a wellbore having an interface between the wellbore and the formation substantially impermeable to fluid, wherein the forming the wellbore comprises:
      drilling, with a drill bit at a downhole end of a drill string, into the formation by breaking the rock at a rock face ahead of the drill bit, wherein an inherent temperature of the rock adjacent the rock face ahead of the drill bit is at least 250 degrees Celsius;
      simultaneously with breaking the rock at the rock face with the drill bit, inducing, in the rock face, thermal stress greater than the tensile strength of the rock by flowing a water- or oil-based drilling fluid at having a temperature at the rock face that is sufficiently low so as to cause the thermal stress, the temperature of the drilling fluid at the rock face being less than the inherent temperature of the rock adjacent the rock face ahead of the drill bit and a difference between the inherent temperature of the rock adjacent the rock face ahead of the drill bit and the temperature of the drilling fluid at the rock face ahead of the drill bit being at least 100 degrees Celsius; and
      sealing the wellbore without the use of casing to form the interface; and
   circulating a geothermal working fluid in a closed loop through the wellbore.

2. The method of claim 1, wherein a downhole end of the wellbore is at a measured depth of at least 4000 meters.

3. The method of claim 1, wherein the difference between the inherent temperature of the rock adjacent the rock face ahead of the drill bit and the temperature of the drilling fluid at the rock face ahead of the drill bit is at least 175 degrees Celsius.

4. The method of claim 1, wherein the inherent temperature of the rock adjacent the rock face ahead of the drill bit is at least 350 degrees Celsius and the difference between the inherent temperature of the rock adjacent the rock face ahead of the drill bit and the temperature of the drilling fluid at the rock face ahead of the drill bit is at least 200 degrees Celsius.

5. The method of claim 1, wherein the inherent temperature of the rock adjacent the rock face ahead of the drill bit is at least 500 degrees Celsius and the difference between the inherent temperature of the rock adjacent the rock face ahead of the drill bit and the temperature of the drilling fluid at the rock face ahead of the drill bit is at least 350 degrees Celsius.

6. The method of claim 1, wherein the wellbore is a lateral wellbore.

7. The method of claim 1, wherein the drill bit comprises a contactless drilling bit configured to break formation material at the rock face ahead of the drill bit without requiring contact between the bit and the rock face.

8. The method of claim 1, wherein the wellbore is a lateral wellbore and wherein forming the closed-loop system comprises drilling the lateral wellbore from a first surface wellbore and connecting, by the lateral wellbore, the first surface wellbore with a second surface wellbore.

9. The method of claim 1, wherein the drill string comprises a plurality of tubular segments, wherein at least one of the tubular segments comprises a coating layer at least partially covering a circumferential surface of the tubular segment, and wherein a length normalized thermal resistance of a coated wall portion of the tubing string is at least 0.002 meters kelvin per watt.

10. The method of claim 9, wherein a length normalized thermal resistance of the coated wall portion is at least 0.01 meters kelvin per watt.

11. The method of claim 9, wherein the plurality of tubular segments are connected to each other at connection joints, and wherein said coating layer at least partially covers a circumferential surface of one or more of the connection joints.

12. The method of claim 1, wherein the wellbore is a first wellbore and further comprising:
   forming a second wellbore that intersects the first wellbore; and
   at least one of:
      flowing a second stream of drilling fluid down the second wellbore, wherein the second stream provides at least a portion of the drilling fluid flowing at the rock face ahead of the drill bit, and
      diverting a return stream of drilling fluid from the downhole end of the first wellbore up the second wellbore.

13. The method of claim 1, further comprising:
positioning an intermediate tubular string in the well;
positioning the drill string within the intermediate tubular string; thereby forming an inner annulus between the exterior of the drill string and the interior of the intermediate tubular string that extends downhole at least partially along the length of the drill string; and
at least partially filling the inner annulus with an insulating material.

14. The method of claim 13, wherein the insulating material comprises a gas.

15. The method of claim 1, further comprising adding to the drilling fluid a phase-change material specified to undergo a phase change proximate to the downhole end of the drill string.

16. The method of claim 1, wherein the drill string comprises an uphole portion comprising a first plurality of tubular segments and a downhole portion comprising a second plurality of tubular segments and wherein a majority of the first plurality of tubular segments have a tensile strength at least 25% greater than the tensile strength of the majority of the second plurality of tubular segments, and a majority of the second plurality of tubular segments are at least 35% lighter than the majority of the first plurality of tubular segments.

17. The method of claim 1, wherein the drilling fluid has a temperature of greater than twenty-five degrees Celsius when flowing in the drill string a surface location at an uphole end of the wellbore.

18. A system for forming a geothermal system comprising a wellbore in a geothermal well in a subterranean zone, wherein an inherent temperature of the rock adjacent a rock face at a downhole end of the wellbore is at least 250 degrees Celsius, the system comprising:
a drill string comprising a drill bit to break the rock at the rock face
a water- or oil-based drilling fluid, the system configured such that, simultaneously with the breaking the rock at the rock face with the drill bit, thermal stress greater than the tensile strength of the rock is induced at the rock face by flowing the drilling fluid at a temperature at the rock face that is sufficiently low so as to cause the thermal stress, the temperature at rock face being less than the inherent temperature of the rock adjacent the rock face ahead of the drill bit and a difference between the inherent temperature of the rock adjacent the rock face ahead of the drill bit and the temperature of the drilling fluid at the rock face ahead of the drill bit is at least 100 degrees Celsius; and
a sealing material configured to seal the wellbore after drilling without the use of casing such that an interface between the wellbore and the formation is substantially impermeable to fluid and a geothermal working fluid can flow in a closed loop through the wellbore.

19. The system of claim 18, wherein the downhole end of the wellbore is at a measured depth of at least 4000 meters.

20. The system of claim 18, wherein the difference between the inherent temperature of the rock adjacent the rock face ahead of the drill bit and the temperature of the drilling fluid at the rock face ahead of the drill bit is at least 175 degrees Celsius.

21. The system of claim 18, wherein the inherent temperature of the rock adjacent the rock face is at least 350 degrees Celsius and the difference between the inherent temperature of the rock adjacent the rock face ahead of the drill bit and the temperature of the drilling fluid at the rock face ahead of the drill bit is at least 200 degrees Celsius.

22. The system of claim 18, wherein the wellbore is a lateral wellbore.

23. A method for forming a geothermal well system, comprising:
in a formation in a subterranean zone, forming a wellbore having an interface between the wellbore and the formation substantially impermeable to fluid, wherein the forming the wellbore comprises:
drilling, with a drill bit at a downhole end of a drill string, a wellbore of the geothermal well in the subterranean zone by breaking the rock at a rock face ahead of the drill bit, wherein:
an inherent temperature of the rock adjacent a rock face ahead of the drill bit is at least 250 degrees Celsius;
the drill string comprises a plurality of tubular segments;
at least one of the tubular segments comprises a coating layer at least partially covering a circumferential surface of the tubular segment; and
a length normalized thermal resistance of a coated wall portion of the tubing string is at least 0.002 meters kelvin per watt; and
simultaneously with breaking the rock with the drill bit at the rock face, inducing, in the rock face, thermal stress greater than the tensile strength of the rock by flowing, while drilling, a water- or oil-based drilling fluid having a temperature at the rock face that is sufficiently low so as to cause the thermal stress, the temperature of the drilling fluid at the rock face being less than the inherent temperature of the rock adjacent the rock face ahead of the drill bit and such that a difference between the inherent temperature of the rock adjacent the rock face and the temperature of the drilling fluid flowing where convective cooling of at the rock face occurs ahead of the drill bit is at least 100 degrees Celsius; and
sealing the wellbore without the use of casing to form the interface; and
circulating a geothermal working fluid in a closed loop through the wellbore.

24. A method for forming a geothermal system, the method comprising:
forming a wellbore having an interface between the wellbore and the formation substantially impermeable to fluids, wherein forming the wellbore comprises:
drilling, with a drill bit at a downhole end of a drill string, into the formation by breaking the rock at a rock face ahead of the drill bit, wherein an inherent temperature of the rock adjacent the rock face ahead of the drill bit is at least 250 degrees Celsius; and
while maintaining the drilling as underbalanced with respect to hydrostatic pressure within the wellbore and simultaneously with breaking the rock at the rock face with the drill bit, inducing, in the rock face, thermal stress greater than the tensile strength of the rock by flowing a water- or oil-based drilling fluid having a temperature at the rock face that is sufficiently low so as to cause the thermal stress, the temperature of the drilling fluid at the rock face being less than the inherent temperature of the rock adjacent the rock face ahead of the drill bit and a difference between the inherent temperature of the rock adjacent the rock face ahead of the drill bit and the temperature of the drilling fluid at the rock face ahead of the drill bit being at least 100 degrees Celsius; and circulating a geothermal working fluid in a closed-loop through the wellbore.

* * * * *